United States Patent
Garman et al.

(10) Patent No.: US 7,997,187 B2
(45) Date of Patent: Aug. 16, 2011

(54) BREWED BEVERAGE MAKER

(75) Inventors: Michael Garman, Midlothian, VA (US); Mark C. Steiner, Midlothian, VA (US); William D. Starr, Richmond, VA (US)

(73) Assignee: Hamilton Beach Brands, Inc, Glen Allen, VA (US)

( * ) Notice: Subject to any disclaimer, the term of this patent is extended or adjusted under 35 U.S.C. 154(b) by 771 days.

(21) Appl. No.: 12/043,359

(22) Filed: Mar. 6, 2008

(65) Prior Publication Data

US 2008/0216667 A1 Sep. 11, 2008

Related U.S. Application Data

(60) Provisional application No. 60/893,918, filed on Mar. 9, 2007.

(51) Int. Cl.
*A47J 31/057* (2006.01)

(52) U.S. Cl. .......................................................... 99/304

(58) Field of Classification Search ................... 99/304, 99/306, 307, 295, 284; 220/813, 812, 811, 220/810, 252, FOR. 192, 350; 126/33, 384.1; D7/355

See application file for complete search history.

(56) References Cited

U.S. PATENT DOCUMENTS

| | | | |
|---|---|---|---|
| 3,050,211 A * | 8/1962 | Hutterer | 220/232 |
| 3,793,935 A | 2/1974 | Martin | |
| 4,550,024 A | 10/1985 | le Granse | |
| 4,630,532 A | 12/1986 | Sonnentag et al. | |
| D290,914 S | 7/1987 | Carlson | |
| 4,694,738 A | 9/1987 | Tarozzi | |
| 4,833,978 A | 5/1989 | Martone et al. | |
| D301,951 S | 7/1989 | Carlson | |
| 5,111,740 A | 5/1992 | Klein | |
| 5,243,164 A * | 9/1993 | Erickson et al. | 219/689 |
| D341,992 S | 12/1993 | Gasser | |
| 5,370,040 A | 12/1994 | Andrew et al. | |
| D401,803 S | 12/1998 | Alferink | |
| 5,881,896 A * | 3/1999 | Presnell et al. | 220/252 |
| 6,009,792 A | 1/2000 | Kraan | |

(Continued)

FOREIGN PATENT DOCUMENTS

EP 2189087 A1 * 5/2010

(Continued)

OTHER PUBLICATIONS

First Office Action Chinese Patent Office; Application No. 200810086448.4; Date of Issuance Sep. 11, 2009; 10 pages.

*Primary Examiner* — Tu B Hoang
*Assistant Examiner* — Mark Woodall
(74) *Attorney, Agent, or Firm* — Alexander D. Raring

(57) ABSTRACT

A beverage maker including a housing, a roll top lid, a brew chamber, a removable fresh water reservoir, and a reversible, storable stand is provided. The roll top lid rotates selectively permit access to the brew chamber, which is enclosed by the housing. In the open position, the roll top lid is substantially concealed within the housing. The fresh water reservoir is located beneath the brew chamber, and the reservoir includes an optional, selectively removable lid with an integrated water level gauge. The stand is stored within the housing beneath the fresh water reservoir. The stand supports a brewed beverage receptacle on a step. In use, the beverage maker dispenses coffee to a brewed beverage receptacle, such as a travel mug, coffee cup or the like.

11 Claims, 22 Drawing Sheets

U.S. PATENT DOCUMENTS

| | | |
|---|---|---|
| D457,774 S | 5/2002 | DeMore et al. |
| D473,745 S | 4/2003 | Mulle et al. |
| D491,012 S | 6/2004 | Rogers |
| 6,766,729 B2 * | 7/2004 | Rolland .................. 99/284 |
| 6,777,007 B2 | 8/2004 | Cai |
| 6,805,042 B2 | 10/2004 | Mordini et al. |
| 6,857,352 B2 | 2/2005 | Fischer |
| D503,064 S | 3/2005 | Since |
| 6,904,840 B1 | 6/2005 | Pfeifer et al. |
| 6,918,257 B2 | 7/2005 | Slone et al. |
| 6,935,222 B2 | 8/2005 | Chen et al. |
| 6,990,891 B2 | 1/2006 | Tebo, Jr. |
| 7,017,472 B2 | 3/2006 | Grant et al. |
| 7,024,983 B2 | 4/2006 | Grant et al. |
| D519,774 S | 5/2006 | Hansen |
| D520,294 S | 5/2006 | Fouquet |
| D521,794 S | 5/2006 | Hansen |
| 7,047,870 B2 | 5/2006 | Gantt et al. |
| D527,214 S | 8/2006 | Hansen |
| 7,093,533 B2 | 8/2006 | Tebo, Jr. et al. |
| 7,131,369 B2 | 11/2006 | Gantt et al. |
| 2003/0066431 A1 | 4/2003 | Fanzutti et al. |
| 2003/0167928 A1 | 9/2003 | Mulle et al. |
| 2004/0187694 A1 | 9/2004 | Cai |
| 2004/0237794 A1 | 12/2004 | Fulgoni et al. |
| 2005/0005774 A1 | 1/2005 | Fulgoni et al. |
| 2005/0076786 A1 | 4/2005 | Meister et al. |
| 2005/0103201 A1 | 5/2005 | Hsu |
| 2005/0155494 A1 | 7/2005 | Brouwer et al. |
| 2005/0160918 A1 | 7/2005 | Winstanley et al. |
| 2005/0172821 A1 | 8/2005 | Chen et al. |
| 2005/0193892 A1 | 9/2005 | Rahn et al. |
| 2005/0235834 A1 | 10/2005 | Blanc et al. |
| 2005/0241489 A1 | 11/2005 | Kirschner et al. |
| 2006/0021514 A1 | 2/2006 | Gantt et al. |
| 2006/0037480 A1 | 2/2006 | Grant et al. |
| 2006/0065126 A1 * | 3/2006 | Turi ............................ 99/279 |
| 2006/0090653 A1 | 5/2006 | McDuffie et al. |
| 2006/0102008 A1 | 5/2006 | Lin |
| 2006/0108023 A1 * | 5/2006 | Greiwe et al. .............. 141/369 |
| 2006/0150823 A1 | 7/2006 | Thomas |
| 2006/0174779 A1 | 8/2006 | Ng |
| 2006/0196363 A1 | 9/2006 | Rahn |
| 2006/0225577 A1 | 10/2006 | Mulder et al. |
| 2006/0254428 A1 | 11/2006 | Glucksman et al. |
| 2006/0266222 A1 | 11/2006 | Hammad |
| 2006/0266223 A1 | 11/2006 | Hammad et al. |
| 2006/0266224 A1 | 11/2006 | Hammad et al. |
| 2006/0283330 A1 | 12/2006 | Lin |
| 2006/0283332 A1 * | 12/2006 | Garman ........................ 99/279 |
| 2007/0000944 A1 | 1/2007 | Cahen et al. |
| 2007/0039479 A1 | 2/2007 | Dalton et al. |
| 2007/0209521 A1 * | 9/2007 | Boussemart et al. .......... 99/275 |

FOREIGN PATENT DOCUMENTS

| | | |
|---|---|---|
| JP | 02102614 A * | 4/1990 |
| JP | 2003083548 A * | 3/2003 |
| WO | 2007008288 | 7/2007 |

* cited by examiner

US 7,997,187 B2

BREWED BEVERAGE MAKER

This application is a continuation of U.S. Application Ser. No. 60/893,918, filed Mar. 9, 2007, which is incorporated herein in its entirety.

The present invention is directed to a brewed beverage maker. Specifically, the invention relates to a beverage maker operable to brew pods containing infusible material or loose infusible material for single cup or travel mug receptacles. The subject coffee maker occupies a relatively small area of a countertop and is easy to clean due to its unique construction.

BACKGROUND

Coffee makers have become common kitchen appliances for almost every home. Users typically place a coffee maker on a countertop beneath their kitchen cabinets. Prior to using a typical coffee maker, a user pours fresh water into the top of the coffee maker. Frequently, the overhanging cabinets above the countertop interfere with a user's ability to pour water into the top of the coffee maker. It can be frustrating for a user of a coffee maker to find sufficient room for placing a coffee maker on an already crowded countertop. Therefore, coffee drinkers tend to prefer space efficient coffee makers that utilize minimal counter space.

Coffee drinkers also appreciate a consistent brew strength and flavor. Typical coffee makers include a filter in a filter basket into which coffee grinds are placed. Due to human error, many times the volume of coffee grinds will vary between brewing cycles. Even the placement of the grinds in the basket might alter the flavor and strength of the brewed beverage. Ideally, a new coffee maker would provide means for a consistent brewed beverage experience.

Along with the coffee maker's form factor and brewing consistency, some coffee drinkers dislike cleaning up their coffee maker following a brew cycle. In particular, spilling the coffee grinds from the filter basket while disposing of the used grinds can be very frustrating and messy. There is a need for a coffee maker that simplifies the cleaning process.

Coffee makers that brew single- or multi-serving coffee pods have become increasingly popular. Many of these pod coffee makers include sealed brewing chambers where fluid is pumped into the chamber. These pressurized brewing chambers are relatively complex.

As a relatively new style of coffee maker to many consumers, it is important that the coffee maker for use with coffee pods be easy to operate, attractive, and flexible for use with both coffee mugs and coffee cups. Ideally, a pod maker, as they are sometimes referred to, would be able to brew both coffee pods and traditional coffee grinds A brewed beverage maker in accordance with the present invention addresses at least one of these or other needs.

SUMMARY

The present invention is directed to a brewed beverage maker adapted to brew beverages from loose infusible material or pods containing infusible material (e.g., coffee grinds sealed in a water permeable shell). Among other advantages, the beverage maker facilitates loading and removing the infusible material to or from the coffee maker, directly dispenses the brewed beverage into a brewed beverage receptacle, is easy to fill with fresh water, and includes a space efficient and unique construction.

A brewed beverage "pod" is generally manufactured from two substantially circular sections of filtering paper joined along their respective circumferential edges and enclosing a quantity of infusible material, such as coffee grinds. The pod is placed in a pod holder and/or in a brew basket that provides a diameter roughly equal to the diameter of the brewed beverage pod. Water is then poured over or otherwise introduced to the pod. The brewed beverage is dispensed through an outlet to a coffee-receiving receptacle.

In one preferred embodiment of the invention, the coffee maker described herein includes a roll top-type lid to selectively expose or cover a brewing chamber including a brew basket, showerhead, dispensing assembly, and/or diverter valve. This rotatable lid facilitates use of the coffee maker relative to traditional coffee makers and also minimizes the amount of space required to store and operate the coffee maker. The roll top lid is substantially concealed within the beverage maker when the roll top lid is open.

The subject brew basket supports one or more coffee pods and includes a selectively mountable upper pod support. The coffee basket also includes a permanent filter so that a user may place loose grinds into the basket without resorting to a paper filter. The brew basket is a dual-purpose basket in that is operable with loose material or pods. The basket is also operable to brew loose infusible material and a pod simultaneously.

The showerhead is mounted on a rotatable arm/conduit. The rotatable conduit conveys fluid from a heater to the showerhead, and the roll top lid is operable to selectively engage and rotate the showerhead and/or conduit. Specifically, rotating the lid to the open position causes tabs on the lid to engage the conduit in order to rotate the showerhead up and away from the brew basket. Rotating the lid from the open position to a closed position causes one or more tabs to rotate and lower the showerhead until it contacts the brew basket. The tabs may also remain in contact with the showerhead/conduit once the lid is closed. As the showerhead contacts the brew basket around, on, or in the perimeter of the brew basket, contact between the lid and showerhead is thought to reduce vapor loss from the brew basket during the brew cycle.

Opening and closing the lid provides user access to the brew basket or at least partially encloses the brew basket via the showerhead, respectively. An optional spring assist may also facilitate the opening of the showerhead. An optional diverter valve could also limit or stop the delivery of liquid to the showerhead when the lid is opened during a brew cycle. Overall, a roll top lid reduces or eliminates the need for space above the coffee maker, as opposed to traditional swinging/pivot type coffee maker lids. In addition, the roll top lid prevents dust, dirt or the like from accumulating within the beverage maker.

A coffee maker in accordance with the present invention is space efficient for reasons other than the roll top lid. For instance, the brewed beverage maker described herein dispenses the brewed beverage to the front of the coffee maker, which eliminates the need for a traditional receptacle recess beneath the filter basket. The deletion of a typical carafe means the coffee maker is smaller and less expensive to the consumer relative to a similar coffee maker with a glass or thermal carafe.

More specifically, the coffee maker includes a brewed beverage dispensing assembly with a downwardly angled channel (trough or tube) that carries the brewed beverage from the interior of the coffee maker to an exterior dispensing position. A dispensing outlet in the channel directs fluid to a receptacle placed below the channel. While the construction of the brew chamber and roll top lip reduces the height of the beverage maker relative to traditional makers, the beverage maker is still operable to dispense a brewed beverage to relatively tall travel mugs, which are popular with consumers. Such travel mugs vary in size, but generally range in size from 7 to 9, tall. A typical coffee cup would be less than 6" tall. A reversible, storable, and stepped receptacle stand permits the use of a travel mug, a coffee cup, or the like with the subject coffee maker.

The construction of the dispensing assembly allows for the fresh water reservoir to be located beneath the brewing chamber. Typically, fresh water reservoirs are located above or behind the brew chamber so as to permit the placement of a carafe or other receptacle beneath the brew basket. The typical arrangement is difficult for consumers to access and often leads to spills as the reservoir is filled.

In one preferred embodiment taught herein, the fresh water reservoir of the subject coffee maker is a front-loading, rectilinear cartridge. When loaded into the beverage maker, the fresh water reservoir floor slopes towards a fluid intake located in the coffee maker. The reservoir includes an optional, removable lid with a concave upper surface. The lid includes a fill aperture and water gauge. The placement of the fresh water cartridge decreases the space required for the coffee maker and is more accessible relative to traditional beverage makers. Specifically, the user need not displace the coffee maker (i.e., pull the coffee maker towards them) in order to fill the coffee maker.

In use, fluid from the reservoir flows through a vertically aligned U-shaped conduit arranged adjacent to a heater. The heater causes the expansion or vaporization of the fluid in the conduit. The heated fluid travels upwards through the conduit to a rotatable conduit and showerhead. The fluid may pass through an optional diverter valve before entering the rotatable conduit and being expelled via the showerhead into the brew basket. The heated water contacts the infusible material in the brew basket. The brewed beverage is collected in the dispensing assembly and delivered to a beverage receptacle.

In one preferred embodiment, opening the lid during a brew cycle creates a bypass opening in the diverter valve. The bypass opening diverts the heated fluid so that the heated fluid at least partially bypasses the showerhead. The diverter valve is wholly encased in a valve housing. Diverted fluid and vapor is collected in the housing and drains through a drain conduit outlet at the bottom of the housing. The diverted fluid is then discharged onto the lid of the fresh water reservoir from the drain conduit. The concave shape of the lid directs the fluid to the fill aperture. In another preferred embodiment, the lid is removed and the discharged, diverted fluid is added directly into the fresh water reservoir. In any event, the diverted fluid is recycled to the fresh water reservoir.

With the diverter valve closed, the heated water is ejected from the showerhead where it is infused by the contents in the coffee basket. The brewed beverage passes through the filter basket and is collected in a brewed beverage reservoir. The reservoir has an outlet to the dispensing channel, and the dispensing channel dispenses the fluid from the front of the coffee maker and above the surface upon which the coffee maker rests. The user, therefore, places their brewed beverage receptacle, such as a coffee mug (e.g., a travel mug) or coffee cup, on the surface so that the receptacle captures the dispensed fluid.

A reversible and storable receptacle stand is provided. The stand provides two steps (i.e., two platforms at different heights to support a receptacles of varying heights). In a first alignment, the second, higher step is placed in a recess in the coffee maker so that the second step is substantially enclosed within the coffee maker. A tall receptacle, such as a coffee travel mug, is placed on the first (lower) step. The step protects a customer's countertop in order facilitate cleaning after a brewing cycle. In a second alignment, the first step is inserted into a corresponding structure provided beneath the coffee maker. The second step is centered beneath the dispensing channel. A relatively short receptacle, such as a coffee cup, is placed on the second step in order to capture the brewed beverage being dispensed during a brew cycle. By elevating the beverage receptacle, the dispensed beverage is less likely to splash out of the receptacle during dispensing. The user can completely remove the stand as needed or desired or store the stand within the coffee maker so that no portion of the stand extends beyond the face of the coffee maker. As such, a compact storage position is provided. The storage stand can also store a pod holder, as described in further detail below.

Further features and advantages of the present invention will become apparent to those of skill in the art from the following detailed description of a preferred embodiment taken in conjunction with the accompanying drawings.

BRIEF DESCRIPTION OF THE DRAWINGS

The features and objects of the subject coffee maker will be better understood from the following detailed description taken in conjunction with the drawings wherein.

DETAILED DESCRIPTION

The present invention is directed to a brewed beverage maker. The beverage maker prepares hot beverages such as tea, coffee, or the like. The terms 'beverage maker' and 'coffee maker' are used herein throughout interchangeably. The coffee maker is described and illustrated in terms of various embodiments. In general, the beverage maker comprises a space efficient and novel construction. A roll top lid provides selective access to a brewing chamber including a showerhead, rotatable conduit, brew basket, and/or dispensing assembly. A front-loading fresh water reservoir is located beneath the brew basket. The dispensing assembly dispenses the brewed beverage out of, and to the front, of the beverage maker. A reversible stand supports brewed beverage receptacles of various sizes. Of course, the present invention is not limited to these specific embodiments but also includes variations and equivalent structures that would be apparent to one of skill in the art.

Figure 1:
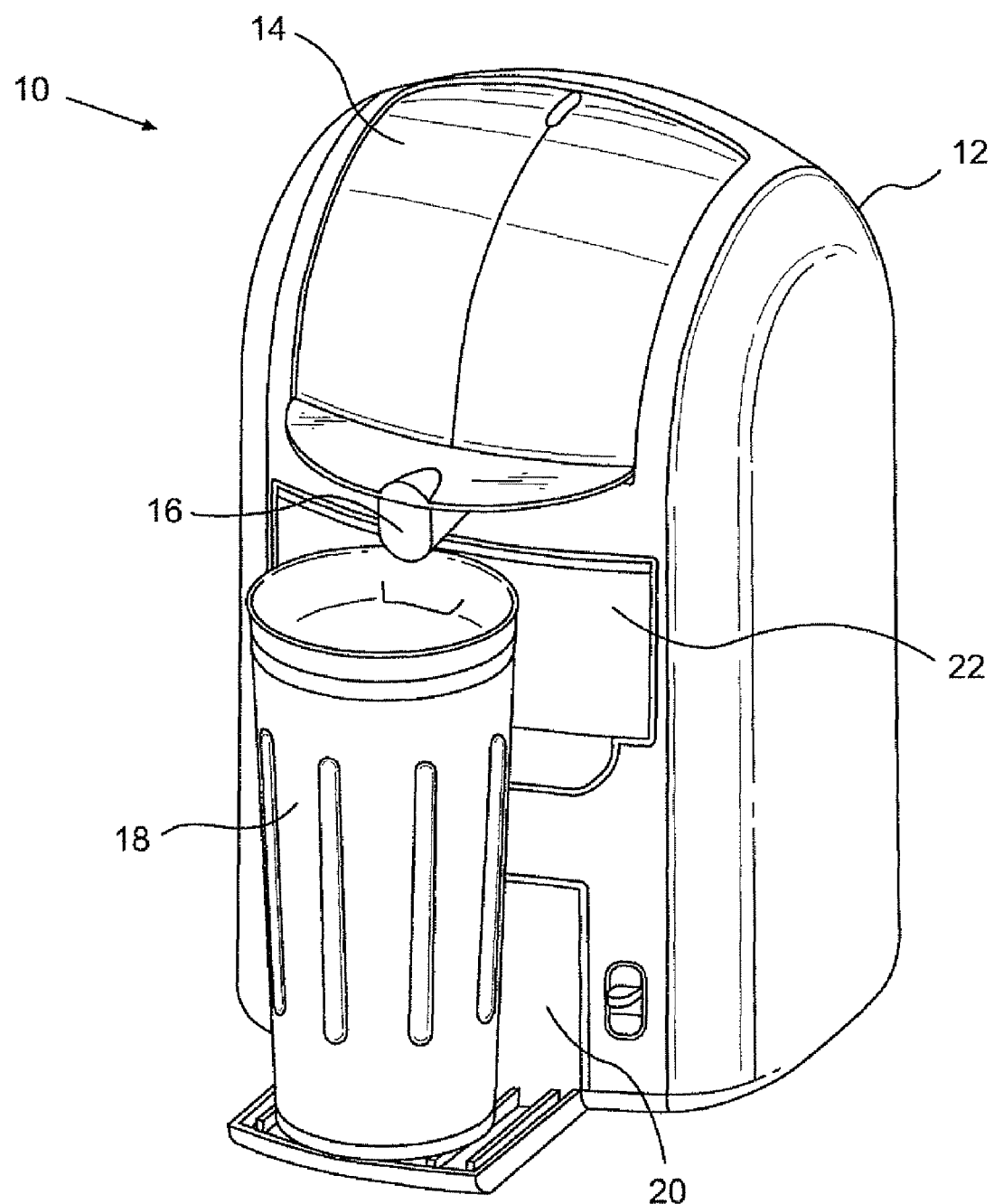
FIG. 1 is a three-quarter, perspective view of a coffee maker in accordance with at least one preferred embodiment of this invention.

Turning now to the drawings, FIG. 1 illustrates an example of a coffee maker 10 having a housing 12 supported by a frame. Housing 12 comprises a front face, a rear face, a curved top panel, and opposing sides formed by arched, rectilinear panels. The curved top panel matches the arch of the side panels and provides an opening to access the space enclosed beneath the top panel. The curved top panel also comprises a roll top lid 14 that selectively opens and closes the top panel opening thereby selectively permitting access to a brew chamber located beneath the top panel.

Considering the exterior of the beverage maker broadly, there is illustrated a dispensing channel 16 that transmits fluid from a brewed beverage reservoir to a brewed beverage receptacle 18. Receptacle 18 can rest on a support surface or be supported on a reversible, stepped stand 20. Fluid to be infused by an infusible material is added to the maker 10 via a fresh water reservoir 22. Fresh water reservoir 22 is a cartridge-style reservoir that is selectively inserted and removed from maker 10.

Figure 2:
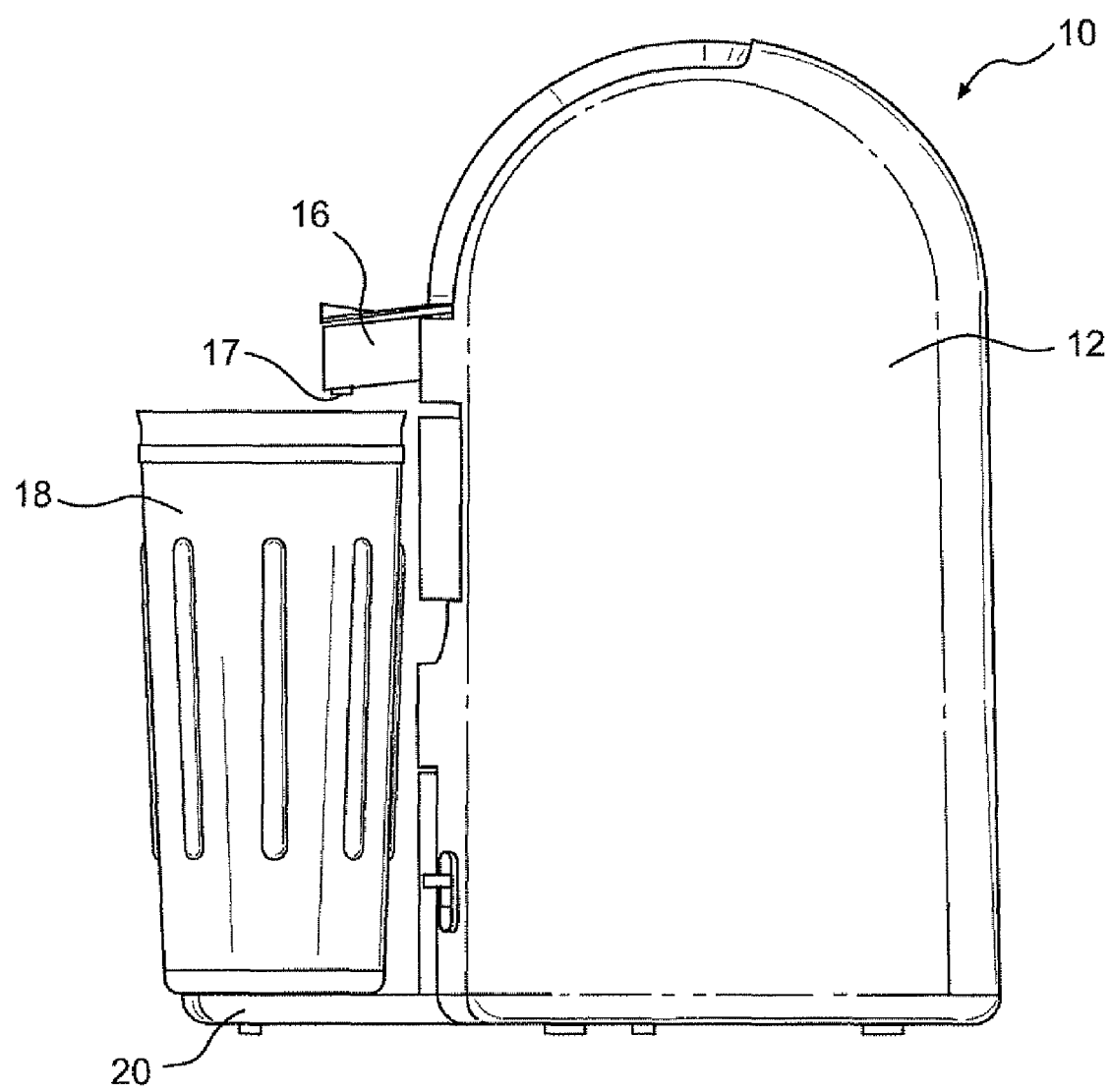
FIG. 2 is a side view thereof.

FIG. 2 illustrates a side view taken from the right side of maker 10. As illustrated in this view, dispensing channel 16 projects out of and to the front of housing 12 (i.e., extends from the front face). Channel 16 is also downwardly angled away from the housing 12 so that any fluid in the channel flows to the end distal of the channel relative to beverage maker 10. A dispensing outlet or aperture 17 is located at the bottom of the distal end of channel 16 and above receptacle 18 and/or stand 20.

Figure 3:
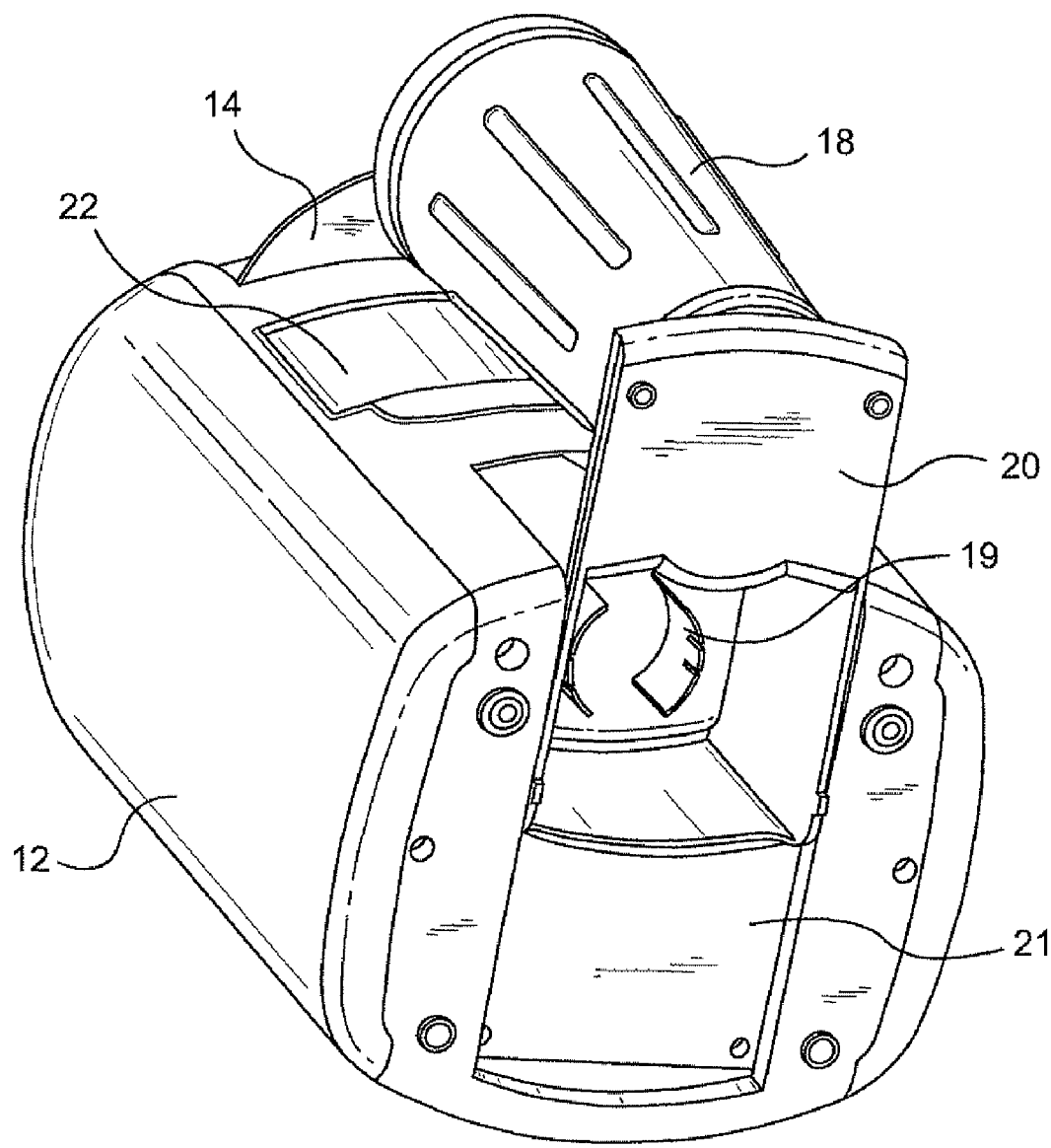
FIG. 3 is another perspective view thereof.

Stand 20 provides a two-step structure. A first, lower step provides a flat surface to support receptacle 18. A second, higher step is also operable to support a receptacle. With reference now to FIG. 3, housing 12 includes a recess 21 that receives stand 20. In a first operating position, and as illustrated in FIG. 3, stand 20 is aligned so that the second step is fully enclosed by housing 12. The lower, first step is projecting from the front of maker 10. The first step is used to support relatively tall receptacles under dispensing outlet 17. The step catches any dripped or spilled brewed beverage, thereby protecting the countertop (not illustrated) upon which maker 10 rests.

In a second operating position, the first step is placed within recess 21 of housing 12 but with the second step located under dispensing outlet 17. The second step is used to support relatively short receptacles, such as coffee mugs. By lifting the relatively short receptacle above the support surface upon which the beverage maker rests, the second step is thought to reduce or prevent splattering of the brewed beverage from the receptacle as the beverage falls from outlet 17 into the receptacle 18. In a storage position, the entirety of stand 20 is placed into the recess 21. The shape and size of the recess substantially corresponds to the shape and size of the stand.

In one preferred embodiment, stand 20 is hollow. A pod holder support 19 is located within stand 20 under the second step. Support 19 comprises a downwardly descending bracket sized and shaped to selectively support a pod holder (not illustrated in FIG. 3 but which is described and illustrated elsewhere herein). The pod holder is frictionally fit, clipped or otherwise retained by pod holder support 19. As such, the pod holder can be stored within the stand when the holder is not in use.

Figure 4:
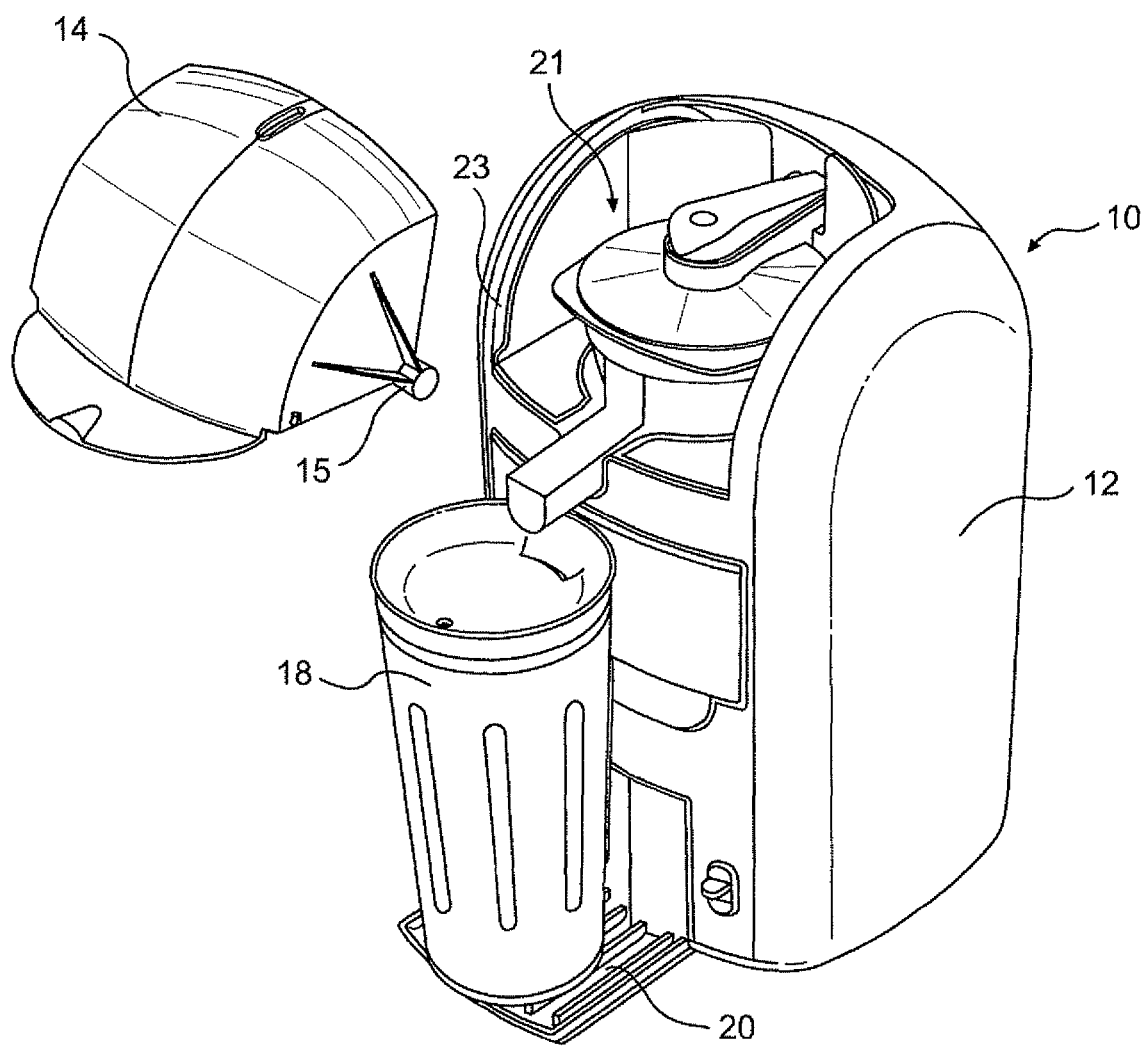
FIG. 4 is a partially exploded perspective view thereof.
Figure 5:
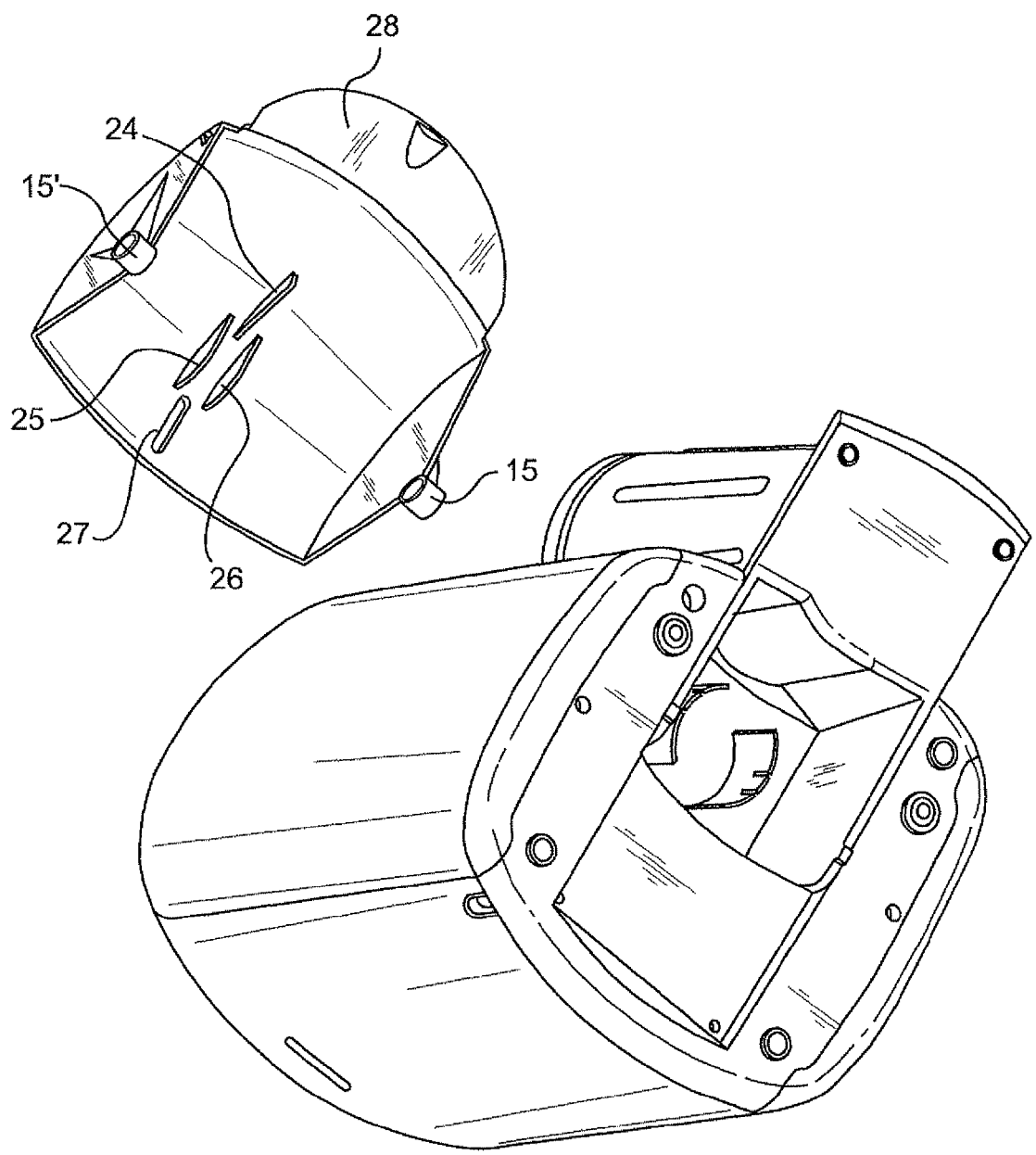
FIG. 5 is another partially exploded perspective view thereof.

Referring now to FIGS. 4 and 5, a partially exploded view of the beverage maker is illustrated wherein roll top lid 14 is displaced in order to illustrate a brewing chamber 21. Lid 14 comprises a curved upper panel and opposing lid sidewalls. When mounted to the beverage maker, the sidewalls are located between the brewing chamber sidewalls and housing 12.

In use, roll top lid 14 rotates about an axis and along a pair of lid slots 23 placed on opposing sides of chamber 21. A pair of axle hinges 15, 15' are provided with one hinge on the outer surface of each lid sidewall. Hinges 15, 15' connect to lid supports (not illustrated) located between the sidewalls of chamber 21 and housing 12. The axle hinges cooperate with the lid supports to provide an axis of rotation about which roll top 14 rotates. As found in roll top desks, the curved upper panel of roll top lid 14 is at least partially concealed as it rotates to the open position. As such, lid 14 is at least partially concealed beneath the top beverage maker panel when the lid is partially open and is substantially or fully concealed when the lid is in the open position. Tabs 24, 25, 26 on the underside of the roll top lid engage a showerhead and conduit, as explained further below.

Lid 14 further includes a lid brim or handle 28. Handle 28 facilitates a user's ability to grasp and rotate the lid. Handle 28 extends perpendicularly from the forward most point of the curved upper lid panel. Handle 28 extends above the top beverage maker panel when lid 14 is open. Likewise, handle 28 extends beyond the front face of beverage maker 10 when lid 14 is closed. A steam vent 27 comprises an aperture in the top panel of lid 14 that allows moisture in brewing chamber 12 to escape, if necessary, brew chamber 21 when lid 14 is closed.

Figure 6:
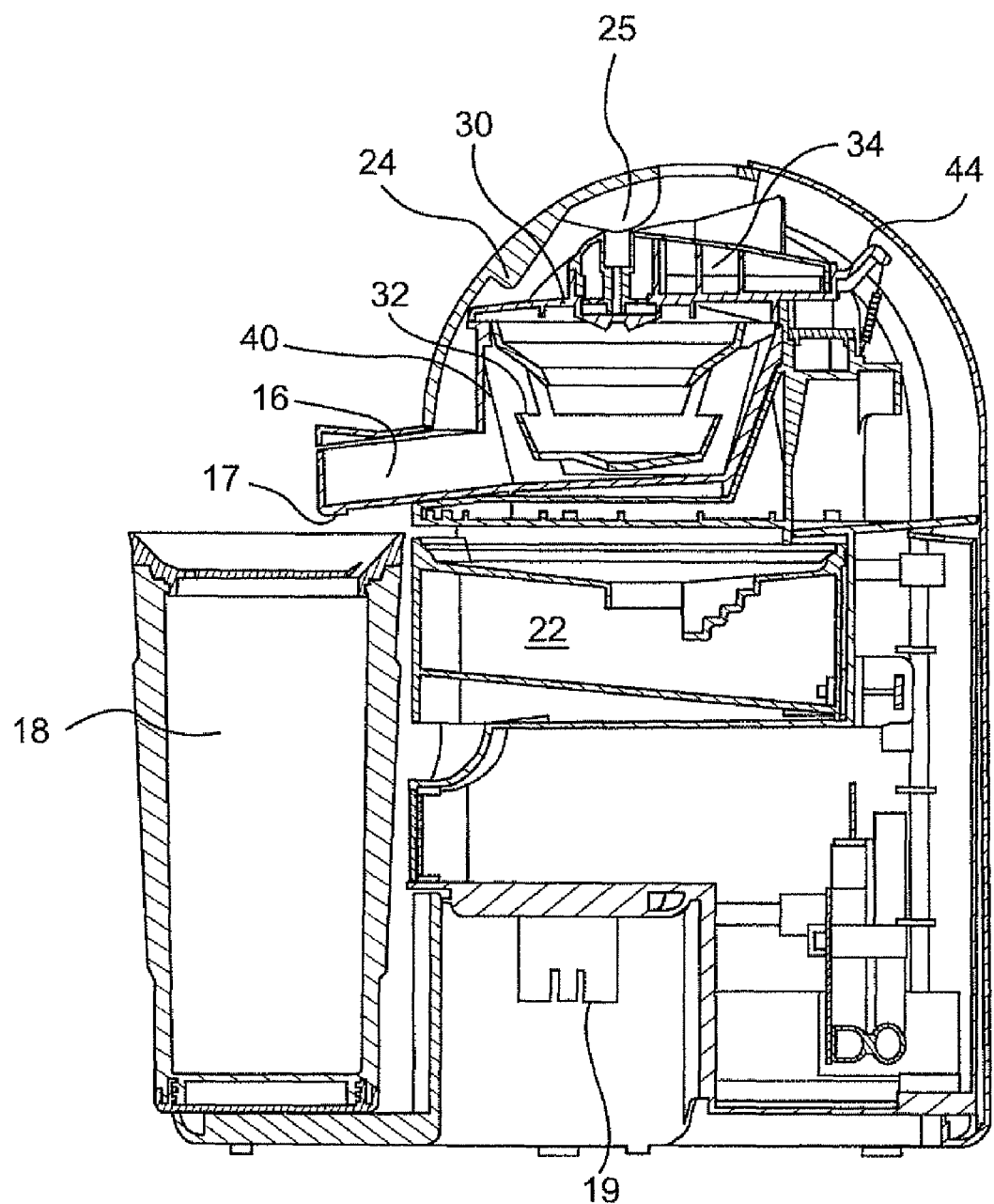
FIG. 6 is a cut-away side view thereof.
Figure 7:
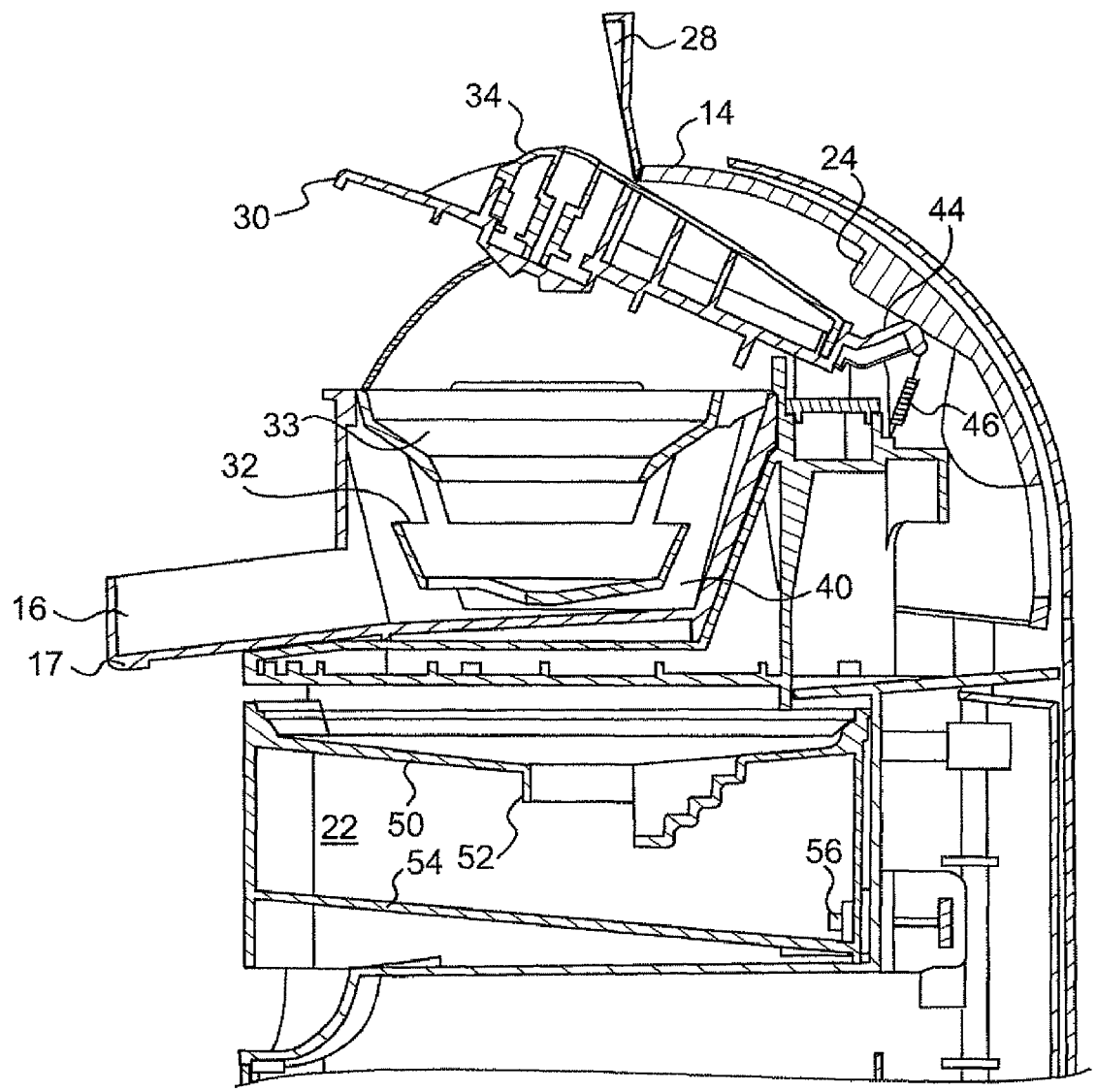
FIG. 7 is another cut-away side view thereof.
Figure 8:
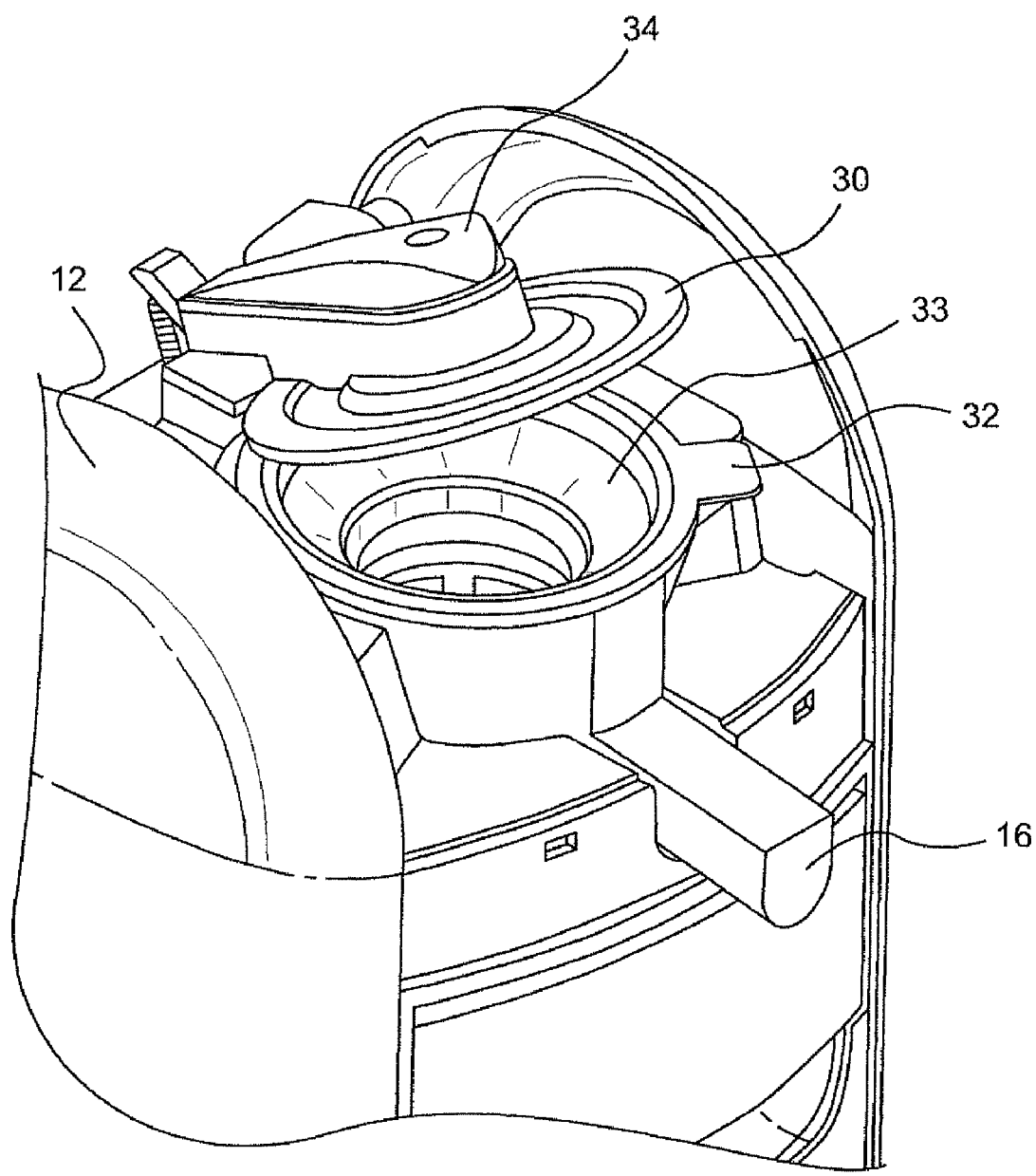
FIG. 8 is a close-up view of a showerhead, filter basket, pod holder, and dispensing assembly according to one preferred.

With reference to FIGS. 6 and 7, tabs 24, 25, 26 act as cams to convert the tangential motion of the roll top lid into the upward and downward rotation of a rotatable arm/conduit 34 and/or showerhead 30. Taken in cross section, as illustrated in FIG. 6, closing tabs 25, 26 contact conduit 34 when the lid is rotated from an open to a closed position. Basically, closing tabs 25, 26 translate the forward rotation of lid 14 into a downward rotational force on conduit 34 and a showerhead 30. This downward rotational force engages showerhead 30 with a coffee basket 32. Closing tabs 25, 26, when lid 14 is fully closed, prevent or reduce the likelihood of showerhead 30 lifting off basket 32 during a brew cycle. "Closing" the showerhead also reduces the loss of liquid vapor from basket 32 during the brew cycle. Therefore, less moisture accumulates in the brewing chamber.

Opening tab 24 engages an extension 44 located on the rear of rotatable arm/conduit 34. Tab 24 engages extension 44, which is located on the end of conduit 34 opposite showerhead 30, when lid 14 is rotated from a closed position to an open position. Tab 24 translates the tangential motion of lid 14 into a downward force on extension 44. As a result, an upward rotation force is provided to conduit 34 and showerhead 30, which are therefore rotated up and away from brew basket 32. Opening lid 14 automatically provides access to basket 32 and any infusible material found therein.

An optional helper spring 46 can facilitate the rotation of the showerhead to the open position, lessening the effort to open roll top 14. A first end of spring 46 is attached to the distal end of extension 44. The second end is secured to body of maker 10. As such, opening lid 14 means tabs 25, 26 are not in contact with conduit 34. Due to the cam force of tab 24 and/or the force of spring 46, conduit 30 rotates upwardly. In at least one preferred embodiment, spring 46 is deleted.

With reference again to FIG. 5, tabs 25, 26 are spaced apart so as to pass by extension 44 without engaging the extension, but are otherwise aligned on lid 14 so as to engage conduit 34, which is wider than extension 44. Although tabs 24, 25, 26 could be deleted for independent control or movement of showerhead 30, providing the mechanism in which to automatically lift and close showerhead 30 via movement of the lid is thought to reduce operator error and facilitate the use of beverage maker 10. Specifically, a customer/user cannot forget to lower the showerhead onto/into the brew basket during a brew cycle.

As further illustrated in FIGS. 6-10, basket 32 comprises an open structural frame (i.e., a frame to define apertures) to support a filter or pod containing infusible material. The basket includes a floor with one or more openings to drain a fluid introduced to the basket. A truncated, circumferential wall rises from the floor to contain a pod or infusible material placed on the floor of basket 32. This wall seals around the edge of the pod to facilitate brewing a beverage from a pod. Additional apertures are provided between the top of the truncated wall and the top of basket 32

In a preferred embodiment, basket 32 comprises a permanent filter consisting of a fine metal mesh spanning the apertures defined by the frame. However, a standard, disposable paper filter could be used as well, either in place of or in addition to the permanent metal filter. Using either type filter, liquid flow through the apertures permits a brewed beverage to pass from the basket while any infusible material is prevented from escaping the basket. Basket 32 holds loose infusible material, such as coffee grinds, or a pod containing infusible material.

A selectively connected pod holder 33 optionally nests within upper half of brew basket 32. The holder includes a hinge mechanism to rotatably secure the holder to the basket. Once selectively connected to or resting in the brew basket, pod holder 33 is rotatable relative to basket 32 via the hinge. Rotation of holder 33 permits access to the area of the basket beneath the holder.

Pod holder 33 is sized and shaped to hold and support a pod filled with infusible material. Holder 33 allows a second pod to be stacked within brew basket 32 over a first pod. A user could optionally place one pod in the pod holder without a corresponding pod in basket 32. In another configuration, a pod is supported in pod holder 33 while coffee grinds or other infusible materials are placed in the bottom of basket 32. It should be understood that beverage maker 10 is operable to brew both prepackaged pods and loose infusible material either independently or simultaneously When selectively removed from basket 32, pod holder 33 can be stored on pod holder support 19, as described above. This provides a compact storage solution, thereby saving a user's cabinet or drawer space for other items.

Beneath basket 32 is a dispensing assembly comprised of a brewed beverage reservoir 40, dispensing channel 16, and dispensing outlet 17. Basket 32 nests in reservoir 40. Reservoir 40 includes a forwardly sloped floor (i.e., the floor is higher to the rear of the beverage maker 10 than it is to the front of the beverage maker 10). In use, fluid travels from a heater through conduit 34, showerhead 30, pod holder 32 (optional), and basket 32, which contains infusible material. The fluid then enters reservoir 40, and the slope of the reservoir floor directs any fluid in reservoir 40 into channel 16. The liquid flows into channel 16, out dispensing outlet 17, and into receptacle 18.

Figure 9:
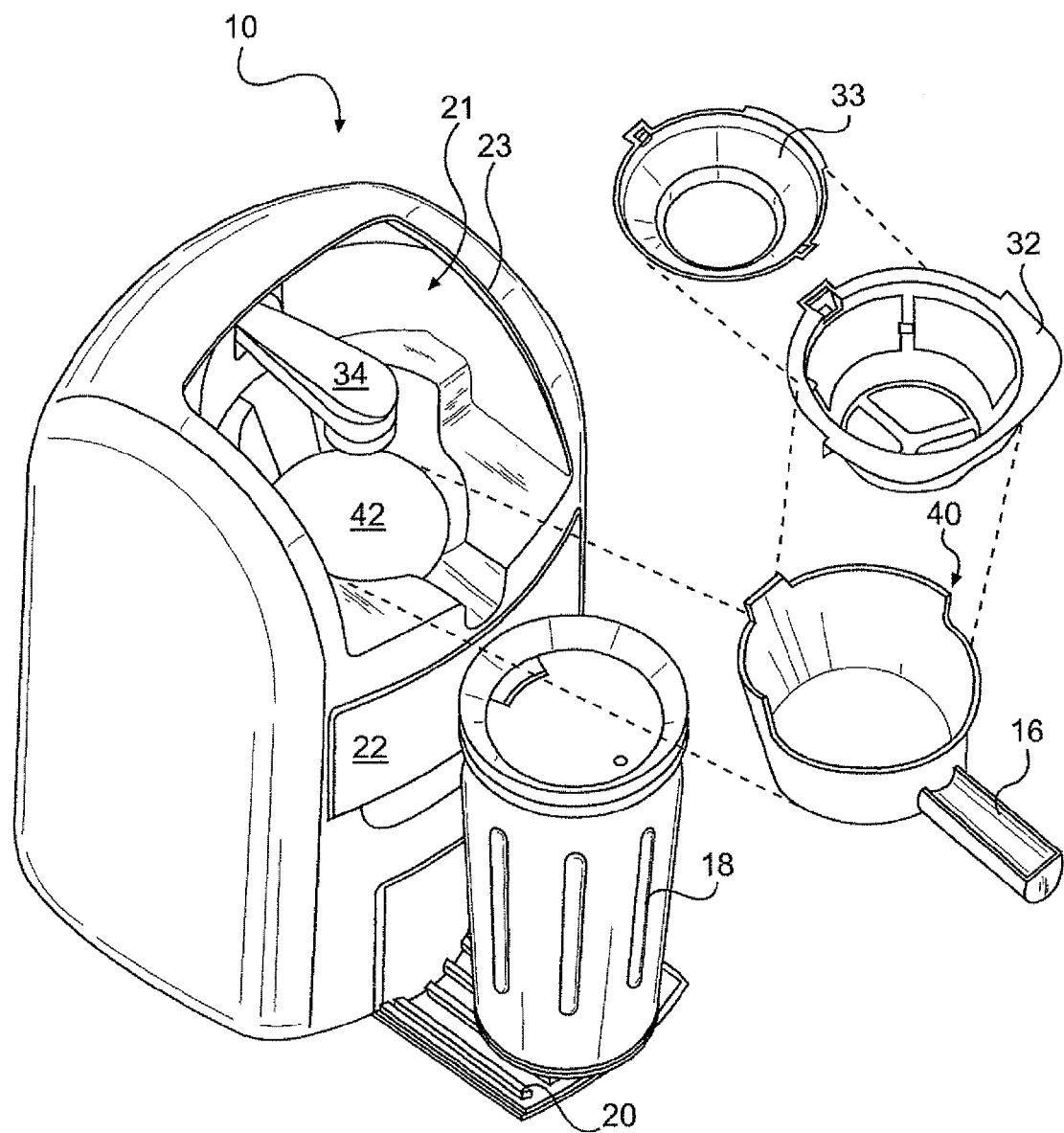
FIG. 9 is a partially exploded view thereof.
Figure 10:
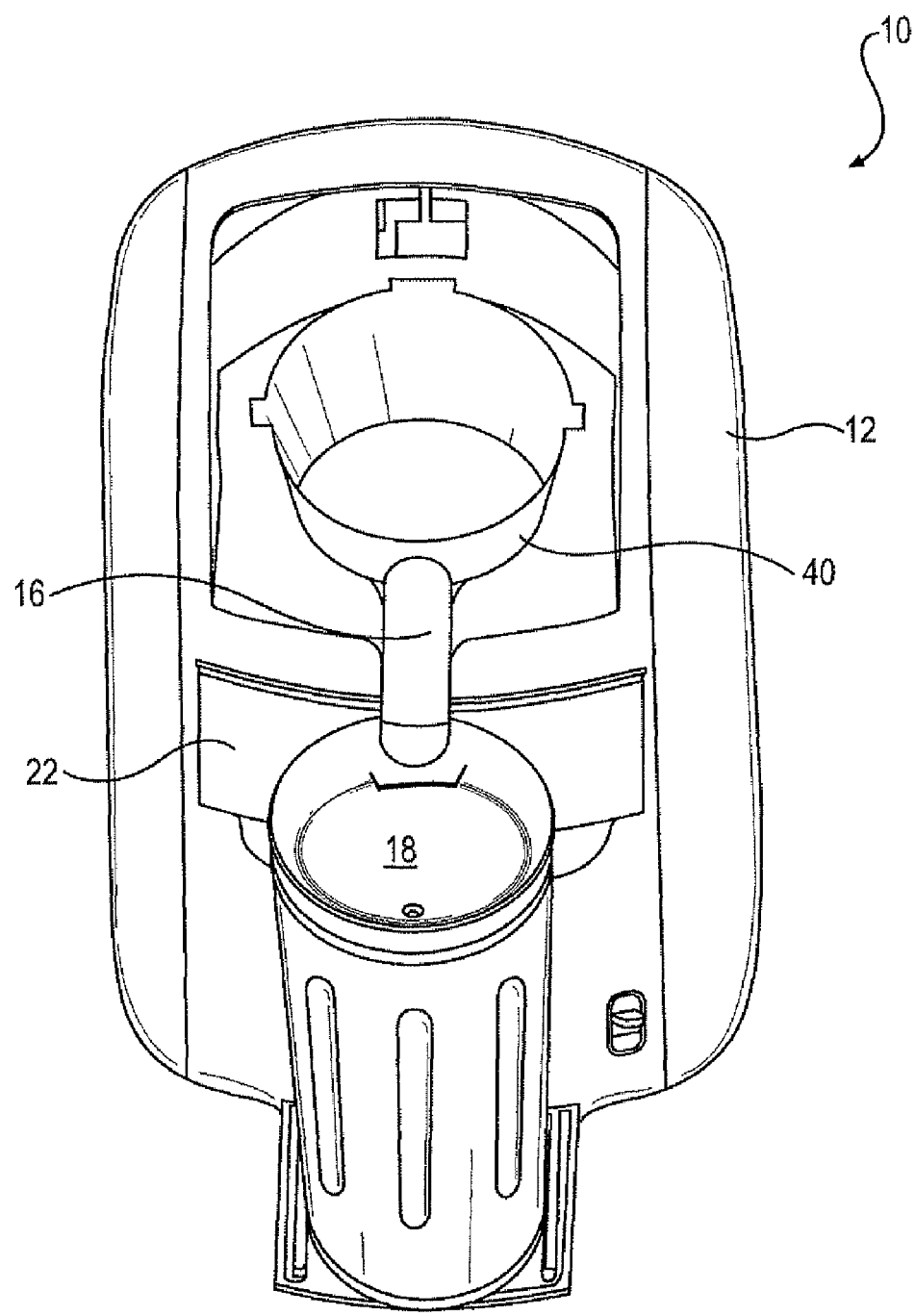
FIG. 10 is a three-quarter top-down view of a coffee maker according to one preferred embodiment.

As FIGS. 9 and 10 illustrate, reservoir 40 rests in a cavity 42 provided by maker 10. Cavity 42 is shaped or molded to support and nestably receive reservoir 40 and channel 16. Reservoir 40 is removable from beverage maker 10 to facilitate cleaning. Disassembly of the dispensing assembly, beverage maker or any other component is not necessary to remove the dispensing assembly from the beverage maker. In addition, basket 32 and pod holder 33 are selectively removable from reservoir 40 so that used infusible material is easily disposed of with minimal effort. Each part is independently removable for easy cleaning of the part, cavity 42, or chamber 21.

Figure 11:
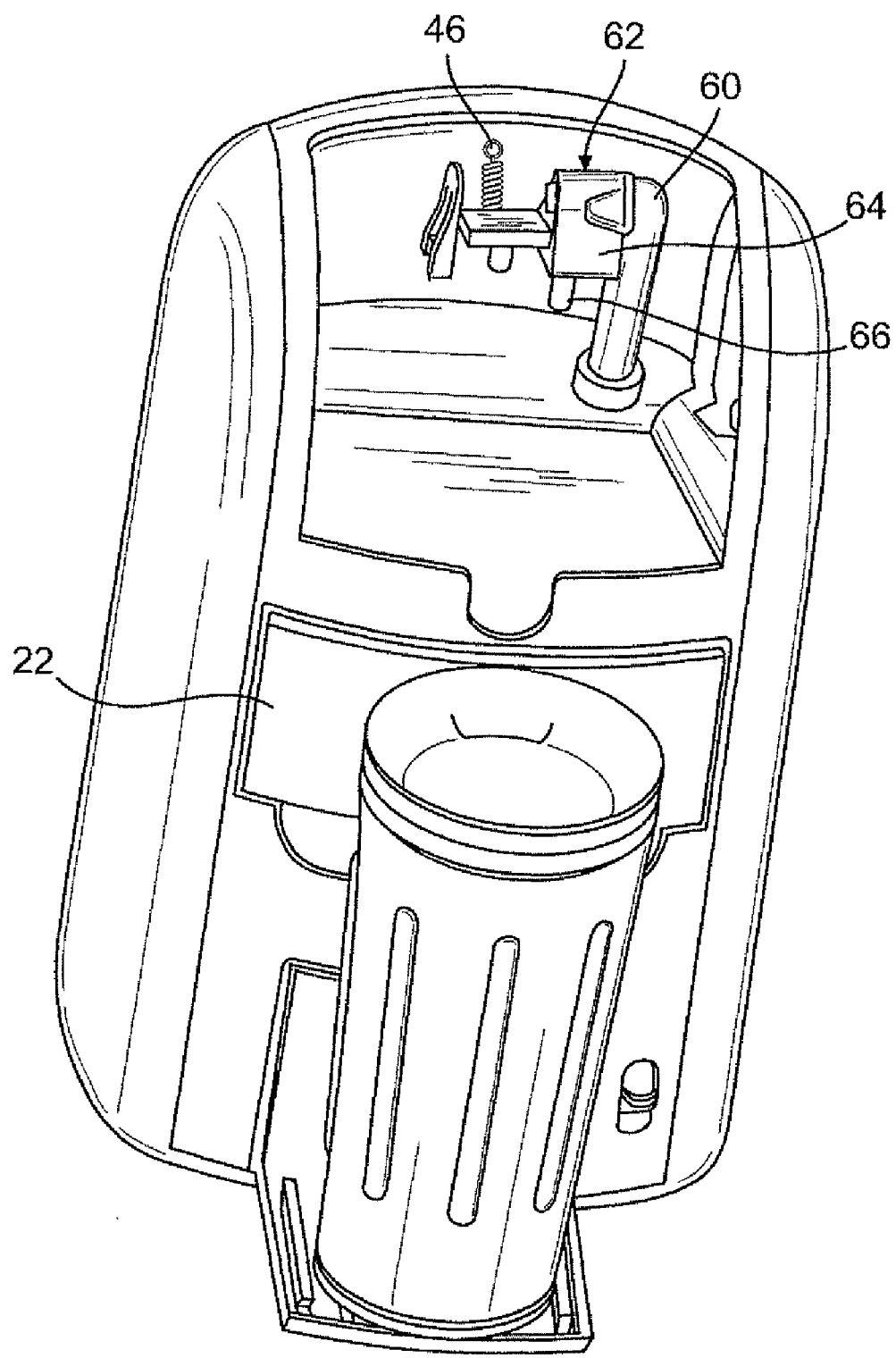
FIG. 11 is a perspective view of a coffee maker according to one preferred embodiment.
Figure 12:
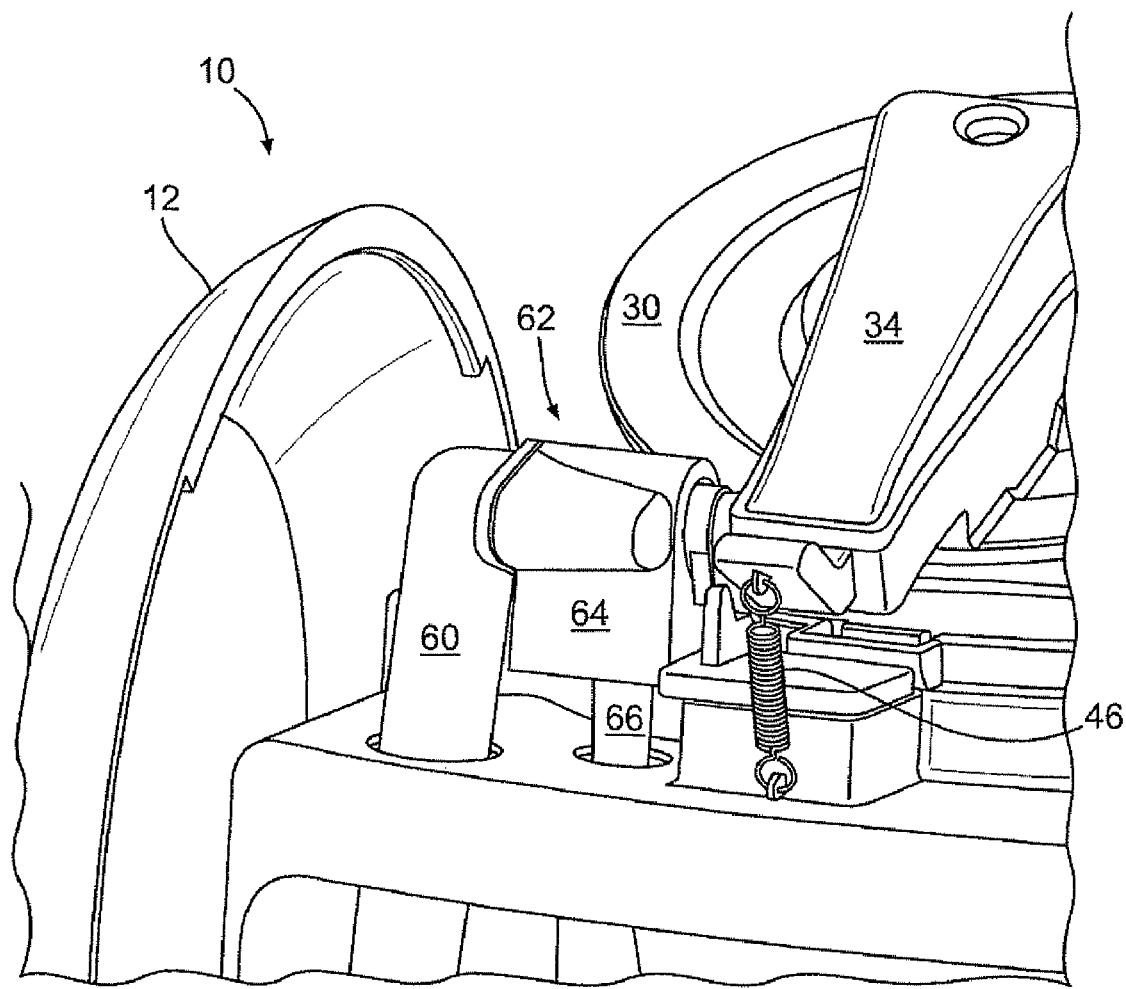
FIG. 12 is a close-up, rear view of a coffee maker according to one preferred embodiment.
Figure 13:
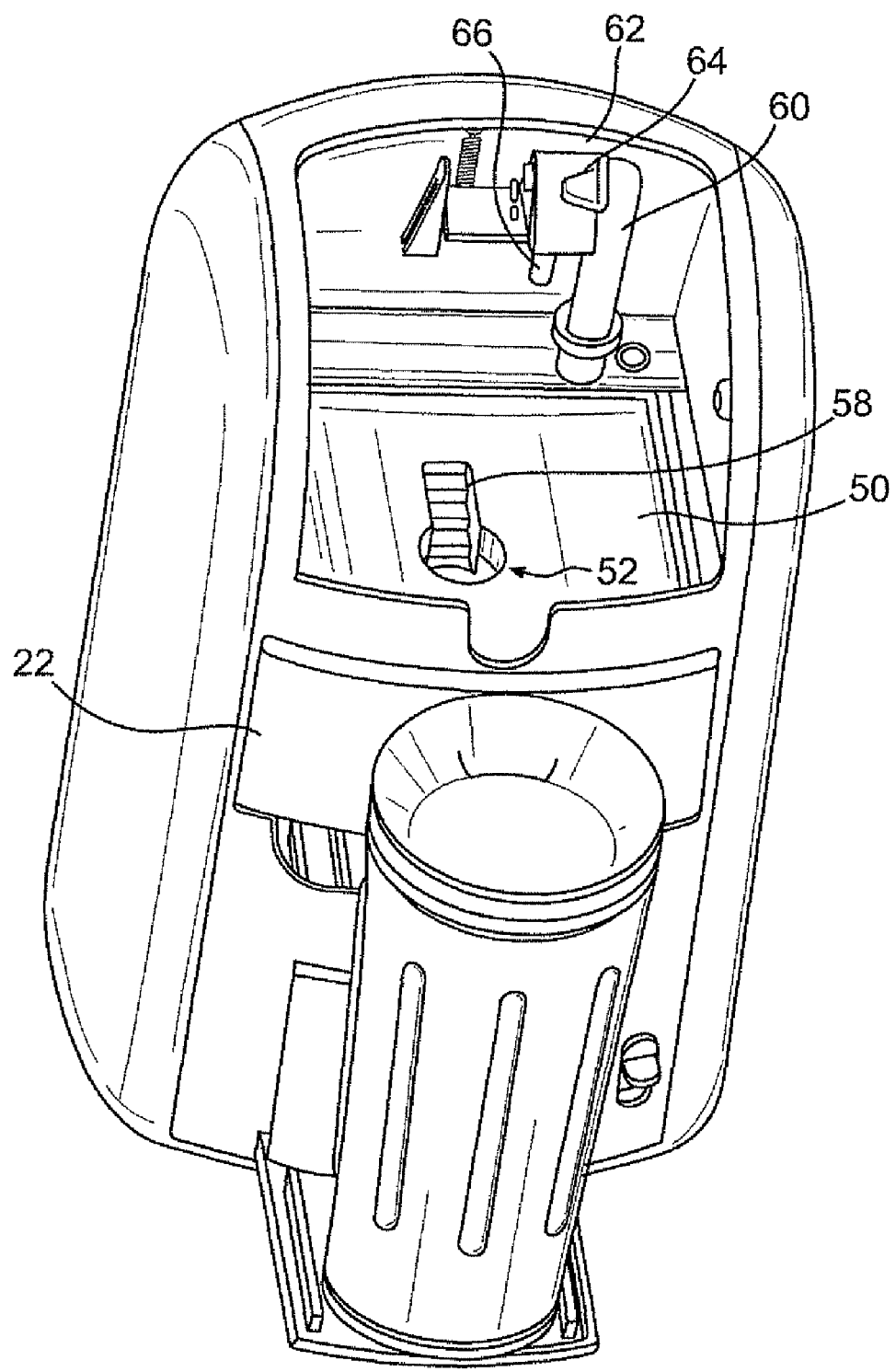
FIG. 13 is a front, elevated perspective view of a coffee maker according to one preferred embodiment.

FIGS. 11 and 12 illustrate an optional diverter valve 62 that is fluidly in-line and between a riser conduit 60 and the rotatable conduit 34. A diverter housing 64 encloses the valve. The valve itself can be a rotary type valve wherein an aperture in the fluid route rotates to meet a corresponding aperture when showerhead 30 is rotated to the open position, as known in the art. The aligned apertures provide an outlet to bypass the typical fluid flow to the showerhead. Housing 64 is unique in that it fully encases the valve. Housing 64, catches any fluid or vapor diverted by valve 62 from conduit 34 when showerhead 30 is lifted from basket 32. The captured, diverted fluid drains via gravity through drain pipe 66 to reservoir 22. Diverted vapor condenses in housing 64 and the condensed liquid also recycles to reservoir 22.

With reference to FIGS. 7 and 13-15C, there is further illustrated beneath the brew chamber 21, brewed beverage reservoir 40 and reservoir cavity 42 the fresh water reservoir 22. Fresh water reservoir 22 is rectilinearly shaped and fits within a corresponding hollow space 59 provided by beverage maker 10. The reservoir is removed and returned to the beverage maker 10 from the front of the beverage maker. Reservoir 22 slides into hollow space 59 on rails, by friction fit, or the like.

Fresh water reservoir 22 includes a rearwardly sloping floor 54 and four sidewalls to contain a fluid. Floor 54 is higher near the front of beverage maker 10 than the rear so that water in the reservoir flows towards to a fresh water intake 56 provided by beverage maker 10. Intake 56 selectively engages reservoir 22 and opens a spring-biased valve provided by the reservoir when the reservoir is inserted into the beverage maker. Basically, intake 56 includes a peg that displaces the valve when the reservoir is installed into the beverage maker. Opening the spring-biased valve permits fluid in reservoir 22 to enter intake 56.

The specific placement of reservoir 22 relative to other maker 10 components allows a user to easily fill the beverage maker and, unlike typical top or rear loading fresh water reservoirs for countertop beverage makers, the user need not move the beverage maker on the countertop in order to access the fresh water reservoir. The fluid is not poured into the beverage maker, and the spills associated therewith are prevented. In addition, the need for sufficient overhead cabinet space in order to access the fresh water reservoir is obviated as the fresh water is added to the front of the coffee maker.

To further facilitate the ease of using front-loading reservoir 22, fresh water reservoir 22 includes an optional, removable lid 50 with a fill aperture 52. The lid forms a concave shape when viewed from the top so that any fluid on lid 50 drains into aperture 52. Lid 50 also optionally includes an integrated water level gauge 58.

Figure 16:
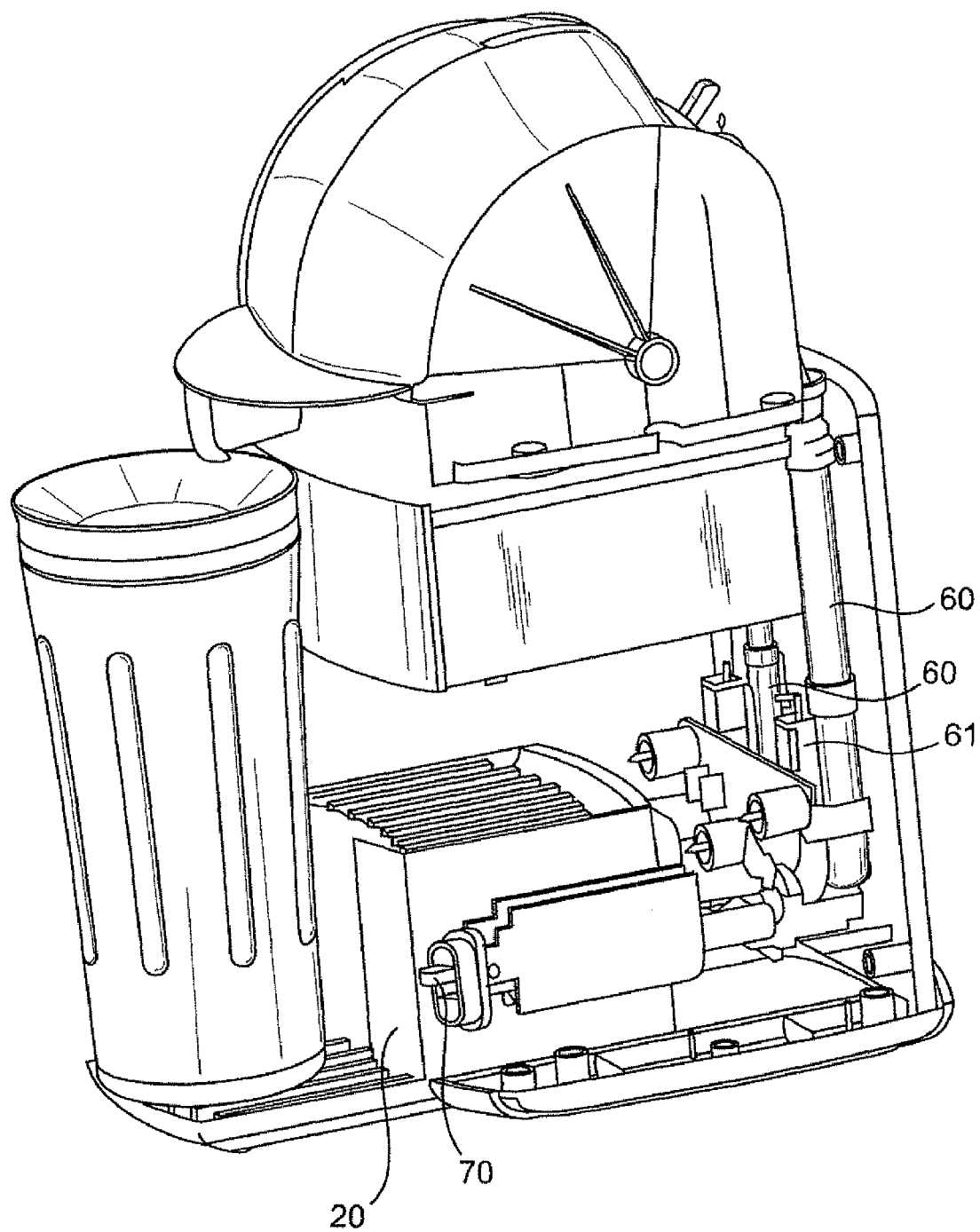
FIG. 16 is a perspective view of a coffee maker according to one preferred embodiment wherein the outer casing of the coffee maker is removed.
Figure 17:
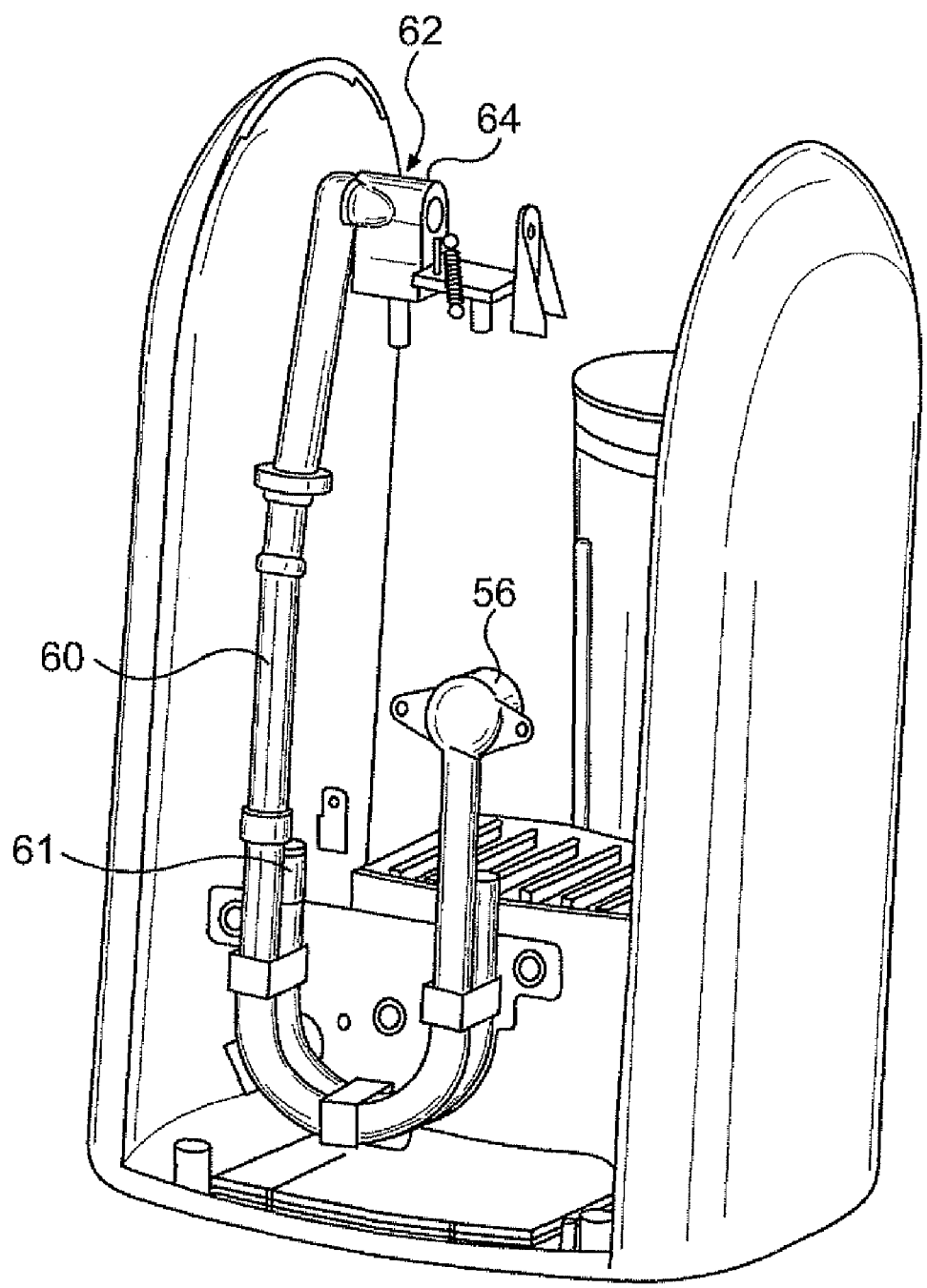
FIG. 17 is a rear perspective view thereof.

As illustrated in FIGS. 16 and 17, the fluid in reservoir 22 initially flows downward in conduit 60. Conduit 60 is physically adjacent to or contacts a heater 61. The fluid in conduit 60 is thereby heated. Once heated, the conduit directs the fluid up through the optional diverter valve to the showerhead. A check valve within the conduit prevents reverse flow form the heater into the reservoir.

Figure 14A:
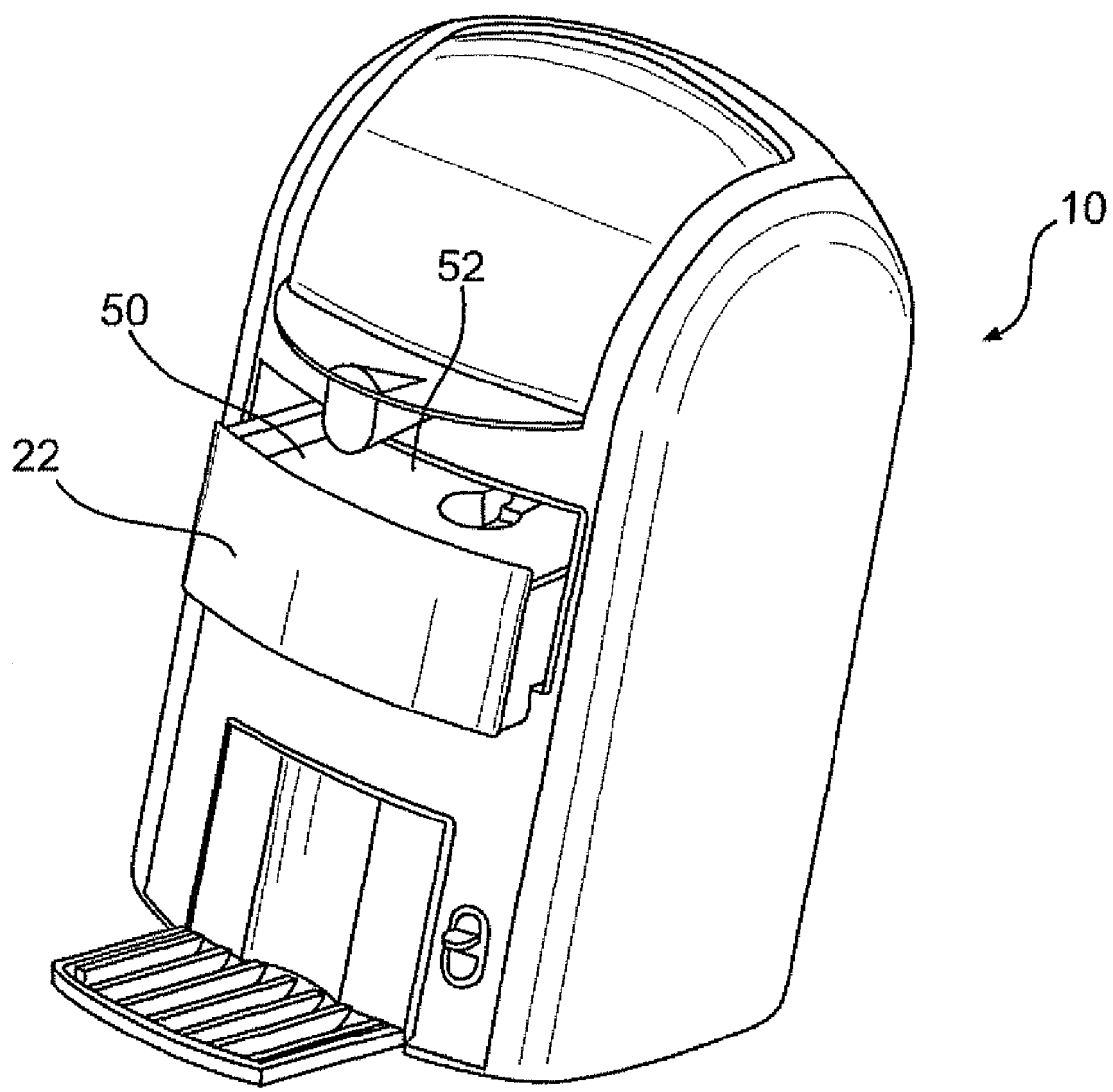
FIG. 14A is another perspective view thereof.
Figure 14B:
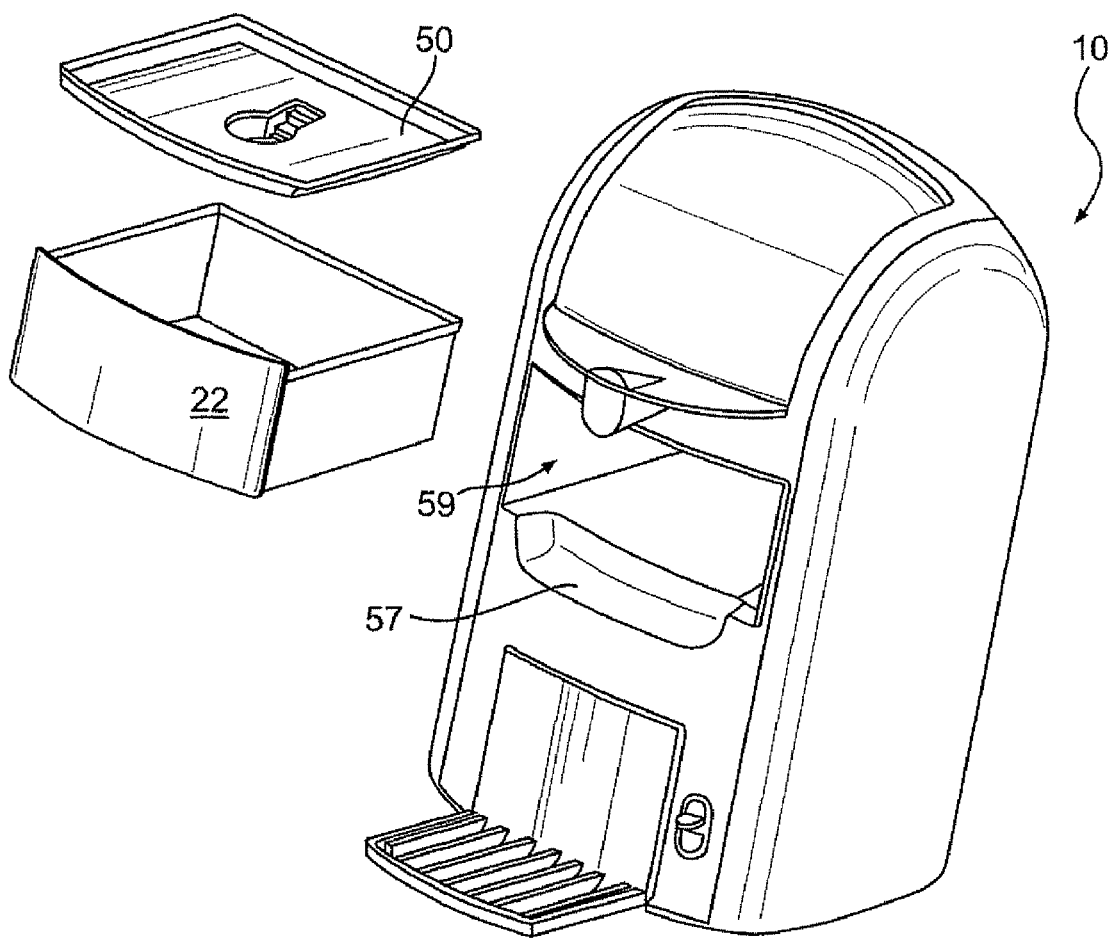
FIG. 14B is another perspective view thereof.

FIG. 14 illustrates reservoir 22 where reservoir 22 is protruding from the front face of maker 10. FIG. 14B illustrates reservoir 22 and lid 50 in an exploded relationship relative to hollow space 59 and beverage maker 10. In one preferred embodiment, housing 12 includes a recess or indentation 57 in the front face of beverage maker 10 that allows a user to grip reservoir 22 when the reservoir is fully inserted into hollow space 59. Otherwise, reservoir 22 is flush with the front face of maker 10 when fully inserted.

Figure 15A:
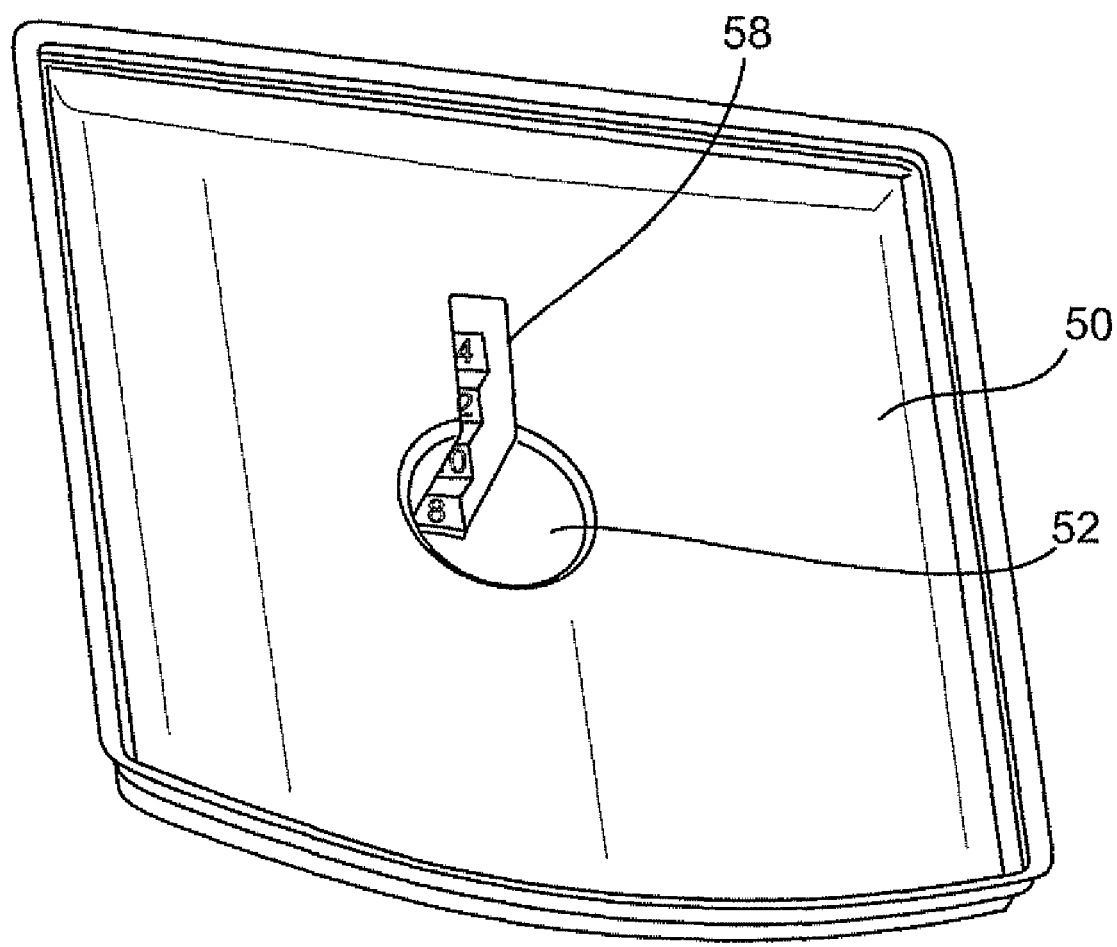
FIG. 15A is a perspective view of a lid for a fresh water reservoir according to one preferred embodiment.
Figure 15B:
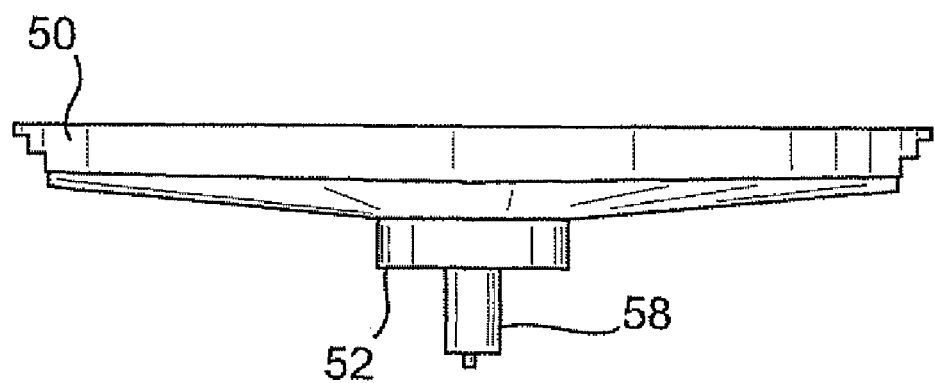
FIG. 15B is a front view thereof.
Figure 15C:
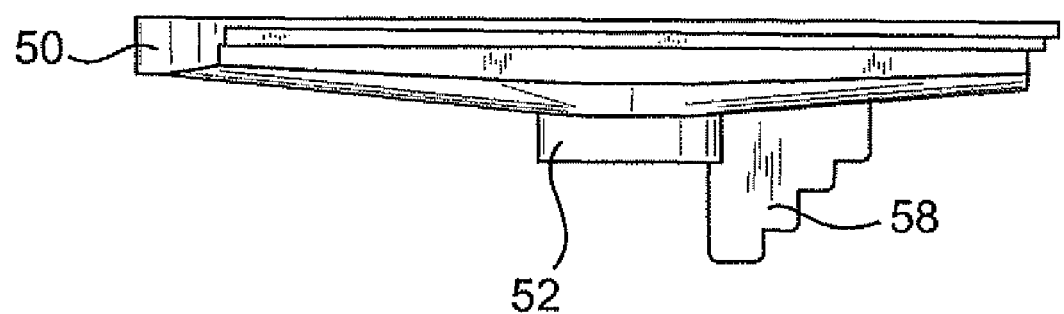
FIG. 15C is a side view thereof.

As illustrated in FIGS. 15A-15C, reservoir lid 50 with water level gauge 58 allows a consumer to better judge the volume of water in the fresh water reservoir. Gauge 58 includes multiple steps descending from the upper surface of lid 50 into reservoir 22. As fluid fills the reservoir, the water will reach the level of each step in turn. Indicia on each step corresponds to and indicates the volume of fluid in the reservoir. In one preferred embodiment, the indicia will comprise a series of numbers starting with the lowest number on the bottom step of gauge 58 and increasing in value to the highest step of gauge 58. Preferably, each indicia or number corresponds to the number of cups of fluid in the reservoir. For instance, when the fluid in reservoir 22 is equivalent to four cups of fluid, the water meets the lowest step, and the step is labeled with the number "4". For FIG. 15A, gauge 58 includes four steps beginning at the bottom with a step labeled as "8" and progressing by twos to the top step labeled 14. Obviously, the specific volume of reservoir 22 and labels of gauge 58 could vary, as needed or desired.

As mentioned above, a drain pipe 66 provides a route for fluid captured in valve housing 64 to drain via gravity. The diverted fluid is directed via pipe 66 onto the fresh water reservoir lid 50 or directly into reservoir 22 (in the event lid 50 is not provided or included). The concave shape of lid 50 directs the drained fluid to fill aperture 52, thereby recycling the fluid.

Returning to FIGS. 16 and 17, there is further illustrated the construction of maker 10 and various features of one or more preferred embodiments of the brewed beverage maker. Housing 12 is removed to better illustrate the internal components. For instance, a power or on/off switch 70 is provided on the face of housing 12. Switch 70 is electrically connected to the vertically aligned, U-shaped heater 61. Typically, such a heater is placed horizontally under a carafe or warming plate. The vertical arrangement of the subject beverage maker saves space and permits the placement of reservoir 22 and stand 20, which are located beneath brew chamber 21.

Heater 61 corresponds, in shape, to a portion of conduit 60. Thermostats, as known in the art, could provide auto-off functionality. Conduit 60 includes a first end connected to intake valve 56. Conduit 60 initially descends from fresh water reservoir 22. The conduit then follows the u-shape of heater 61, and ascends to the brew chamber 221. The second end of conduit 60 either terminates at the optional diverter valve 62 or rotatable conduit 34.

In use, actuating switch 60 permits electricity to flow to heater 61 thereby causing the heater to generate heat. This heats the fluid in conduit 60 adjacent heater 61. As known in the beverage making art, the heated fluid travels up a riser conduit, as discussed above.

Figure 18:
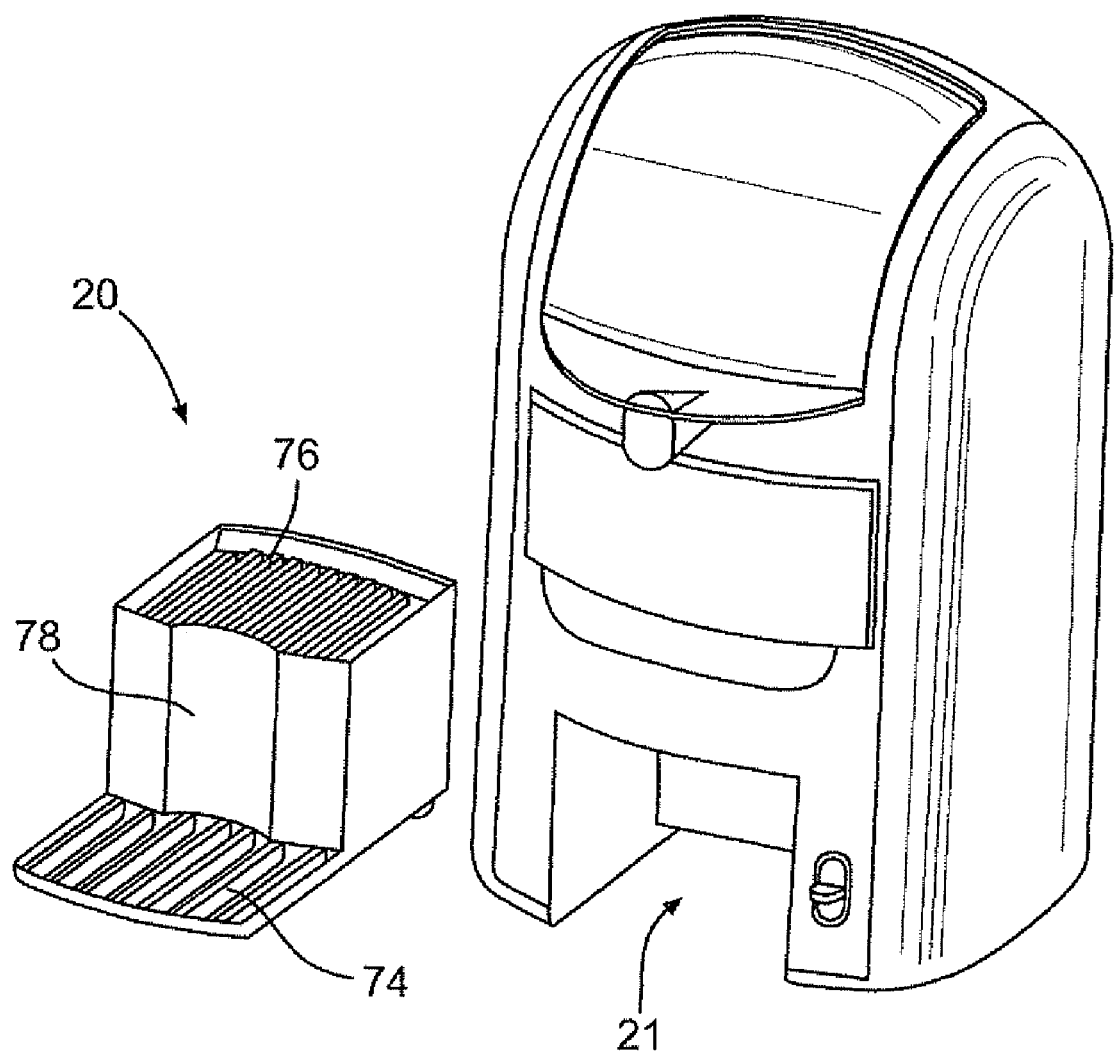
FIG. 18 is an exploded, perspective view of a coffee maker and receptacle stand according to one preferred embodiment.
Figure 19:
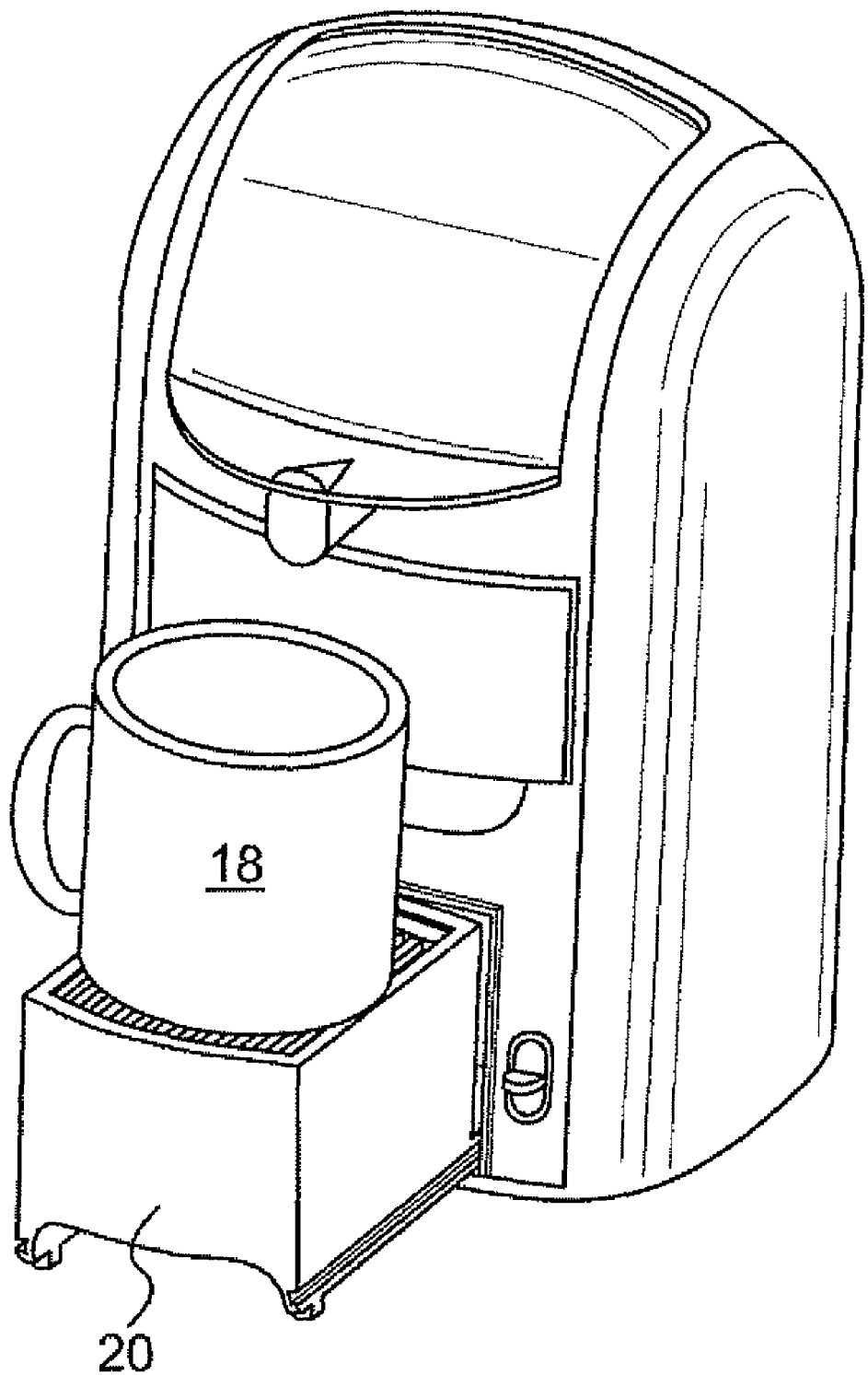
FIG. 19 is a perspective view of a coffee maker and receptacle stand wherein the stand is aligned for use with a coffee cup according to one preferred embodiment.
Figure 20:
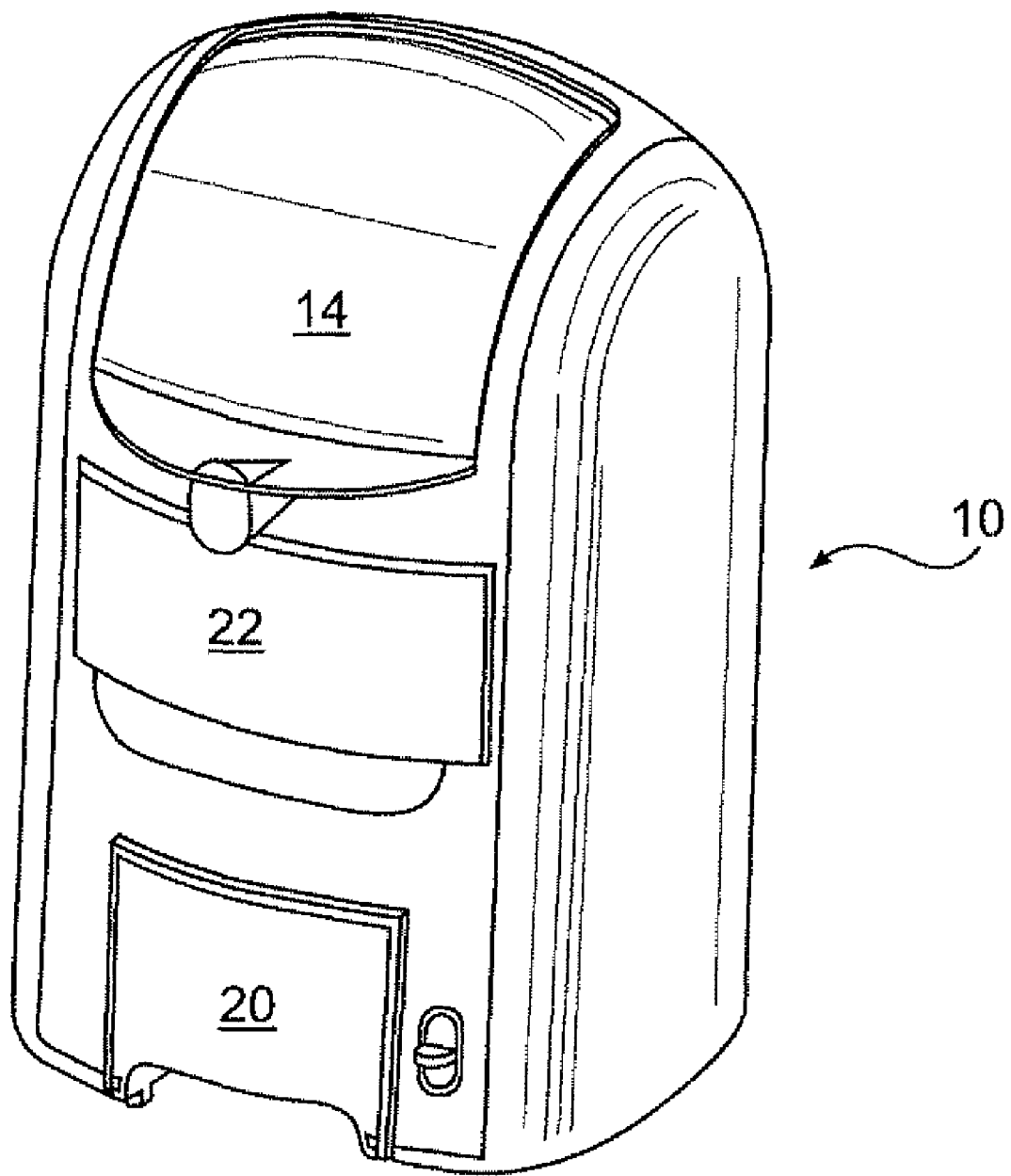
FIG. 20 is perspective view of a coffee maker wherein a receptacle stand is stored within the coffee maker according to one preferred embodiment.

With reference to FIGS. 18, 19 and 20, operation and storage of stand 20 is better understood. A first, lower step 74 supports taller receptacles. The lower step increases the distance between dispensing channel 16 and stand 20, which permits the use of a taller receptacle 18. A contoured face 78 optionally engages and supports the receptacle. Stand 20 is removable from maker 10 completely. Stand 20 can also be reversed with first step 74 placed under maker 10 with second step 76 located in front of maker 10. The higher, second step 76 decreases the distance from dispensing outlet 17 to a receptacle on the stand. Therefore, when a user chooses a smaller or shorter receptacle to receive the brewed beverage, use of stand 20 and second step 76 decreases the splattering or splashing. As illustrated in FIG. 20, stand 20 can also be stored completely flush to housing 12 in recess 21. Storing stand 20 conserves countertop space, as desired by consumers. As described above, pod holder 33 can be stored in stand 20 via pod holder support 19.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A beverage maker operable to infuse a liquid with an infusible material in order to create a brewed beverage, the beverage maker comprising:
   a housing including a front face, rear face, top panel, and opposing sides, the beverage maker top panel further including an aperture;
   a roll top lid, the lid being selectively actuatable to open and close the top panel aperture;
   a brew chamber enclosed by the housing, the brew chamber comprising a brew basket, a rotatable conduit and a rotatable showerhead;
   an axis of rotation about which the roll top lid rotates between an open position and a closed position, the roll top lid physically engaging the showerhead so that the rotation of the roll top lid to the open position effects an upward rotational force to the showerhead and conduit while the rotation of the roll top lid to the closed position effects a downward rotation force to the showerhead and conduit; and
   wherein the roll top lid is substantially concealed beneath the beverage maker top panel when the roll top lid is in the open position.

2. The beverage maker of claim 1, the roll top lid further comprising a handle, the handle extending above the top beverage maker panel when the roll top lid is in the open position; and
   the handle extending beyond the front face of the beverage maker when the roll top lid is in the closed position.

3. The beverage maker of claim 1, the brew chamber further comprising a dispensing assembly, the dispensing assembly including a brewed beverage reservoir, a dispensing channel, and a dispensing outlet; and
   wherein the brewed beverage enters the brewed beverage reservoir via the brew basket, the brewed beverage reservoir directing the brewed beverage into the dispensing channel, through the dispensing outlet, and into a brewed beverage receptacle, the dispensing channel extending outwardly from the front face of the housing.

4. The beverage maker of claim 3, the brew chamber further comprising a cavity shaped and dimensioned to nestably receive the brewed beverage reservoir and dispensing channel, the dispensing assembly being selectively removable from the brewing chamber and cavity.

5. The beverage maker of claim 1, the brew basket comprising a structural frame with a plurality of basket apertures;
  a filter permitting a brewed beverage to flow from the basket via the basket apertures while retaining infusible material in the basket;
  a pod holder supported by the basket; and
  wherein the brew basket is operable to brew loose infusible material alone, a pod containing infusible material alone, and loose infusible material and a pod containing infusible material simultaneously.

6. A beverage maker operable to infuse a liquid with an infusible material in order to create a brewed beverage, the beverage maker comprising:
  a housing enclosing a space and including a front face,
  a brew chamber enclosed by the housing;
  a brewed beverage receptacle receiving a brewed beverage from the beverage maker;
  a recess defined by the housing in the front face of the housing;
  a stand, the stand providing a first step and a second step at different heights, the first step and the second step sized and dimensioned to support the brewed beverage receptacle;
  a first stand alignment where the first step is accessible to support a beverage receptacle and the second step is positioned within the recess and is inaccessible;
  a second stand alignment where the second step is accessible to support a beverage and the first step is inaccessible.

7. The beverage maker of claim 6, the brew chamber further comprising a brew basket and a dispensing assembly, the dispensing assembly including a brewed beverage reservoir, a dispensing channel, and a dispensing outlet, the dispensing channel projecting out of the of the space enclosed by the housing; and
  a fresh water reservoir selectively insertable into and removable from the housing, the fresh water reservoir located beneath the brew chamber.

8. The beverage maker of claim 7, wherein the fresh water reservoir further comprises a rectilinear shape with a floor and four sidewalls;
  the beverage maker further comprising an intake, the intake engaging and opening a check valve in the reservoir, the floor sloping towards the intake valve;
  a lid attached to the reservoir;
  a fill aperture in the lid; and
  an integrated water level gauge provided by the lid wherein the gauge includes multiple steps descending from the upper surface of the lid into the reservoir.

9. The beverage maker of claim 8, the beverage maker further comprising a first aperture in the housing, the first aperture providing access to the brew chamber;
  a roll top lid, the lid being selectively actuatable to open and close the first aperture;
  an axis of rotation about which the roll top lid rotates between an open position and a closed position; and
  wherein the roll top lid is substantially concealed within the beverage maker housing when the roll top lid is in the open position.

10. The beverage maker of claim 9, wherein the recess is located beneath the brew chamber; and
  wherein the inserted fresh water reservoir is located between the stand and the brew chamber.

11. The beverage maker of claim 6, further comprising a third stand alignment where the stand is stored within the recess so that no portion of the stand extends beyond the face, each of the first step and the second step being inaccessible.

* * * * *